US012580801B1

(12) United States Patent
Rofougaran et al.

(10) Patent No.: US 12,580,801 B1
(45) Date of Patent: Mar. 17, 2026

(54) WIRELESS COMMUNICATION DEVICE AND METHOD TO OPERATE NEAR-FULL DUPLEX WIRELESS MESH NETWORK

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Beach, CA (US); Milan Rofougaran, Newport Coast, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 19/332,397

(22) Filed: Sep. 18, 2025

(51) Int. Cl.
*H04L 27/26* (2006.01)
*H04L 5/00* (2006.01)

(52) U.S. Cl.
CPC ........ *H04L 27/2656* (2013.01); *H04L 5/0098* (2013.01); *H04L 27/261* (2013.01)

(58) Field of Classification Search
CPC .. H04L 5/0098; H04L 27/261; H04L 27/2656
See application file for complete search history.

(56) References Cited

U.S. PATENT DOCUMENTS

| | | | | |
|---|---|---|---|---|
| 10,432,387 | B2 * | 10/2019 | Hosseini | ............... H04L 5/1469 |
| 2018/0254826 | A1 * | 9/2018 | Jungnickel | ......... H04B 10/1149 |
| 2022/0294127 | A1 * | 9/2022 | Ross | .................... H01Q 21/245 |
| 2023/0327708 | A1 * | 10/2023 | Abdelmonem | ...... H04J 11/0023 |
| | | | | 455/63.1 |

* cited by examiner

*Primary Examiner* — David B Lugo
(74) *Attorney, Agent, or Firm* — CHIP LAW GROUP

(57) ABSTRACT

A wireless communication device includes a first wireless radio transceiver to operate on a first frequency band with a first time-division duplexing (TDD) configuration that allocates more time for radio frequency (RF) signal transmission than RF signal reception. The wireless communication device includes a second wireless radio transceiver that operates on second frequency band with second TDD configuration that allocates more time for RF signal reception than RF signal transmission. The wireless communication device further includes one or more dual-polarized phased array antennas that communicates data on orthogonal polarizations. The wireless communication device concurrently controls communication with one or more wireless communication devices of a plurality of wireless communication devices on the first frequency band and the second frequency band based on the first TDD configuration and the second TDD configuration and further based on the communication of the data on the orthogonal polarization.

20 Claims, 6 Drawing Sheets

300

300

500

Operate first wireless radio transceiver on first frequency band with first time-division duplexing configuration that allocates more time for radio frequency (RF) signals transmission than RF signal reception 502

Operate second wireless radio transceiver on second frequency band with second time-division duplexing configuration that allocates more time for RF signal reception than RF signal transmission 504

Execute trained neural network model to predict local data transmission and reception demand based on historical data usage patterns at wireless communication device 506

Adjust first time-division duplexing configuration and second time-division duplexing configuration based on local data transmission and reception demand 508

Generate plurality of beams of RF signals in narrow beam pattern with beamwidth between 10 degrees to 30 degrees 510

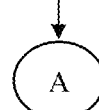

500

Determine hopping sequence for plurality of beams of RF signals in narrow beam pattern for controlling of communication with one or more wireless communication devices 512

Communicate data on orthogonal polarizations based on first time-division duplexing configuration and second time-division duplexing configuration 514

Concurrently control communication with one or more wireless communication devices of plurality of wireless communication devices on first frequency band and second frequency band based on first time-division duplexing configuration and the second time-division duplexing configuration, and communication of data on the orthogonal polarizations 516

Switch between plurality of beams of RF signals for controlling of communication with one or more wireless communication devices of plurality of wireless communication devices 518

Switch between plurality of beams of RF signals at higher switching frequency at transmission periods of first time-division duplexing configuration than at transmission periods of second time-division duplexing configuration 520

Switch between plurality of beams of RF signals at higher switching frequency at reception periods of second time-division duplexing configuration than at reception periods of first time-division duplexing configuration 522

FIG. 5B

WIRELESS COMMUNICATION DEVICE AND METHOD TO OPERATE NEAR-FULL DUPLEX WIRELESS MESH NETWORK

CROSS-REFERENCE TO RELATED APPLICATIONS/INCORPORATION BY REFERENCE

None

FIELD OF TECHNOLOGY

Certain embodiments of the disclosure relate to a wireless communication system. More specifically, certain embodiments of the disclosure relate to a wireless communication device and a method to operate the wireless communication device in a near-full duplex wireless mesh network.

BACKGROUND

Conventional wireless communication devices, such as Wi-Fi® routers, access points, and mesh network nodes, are commonly used to provide internet connectivity and extend wireless coverage across homes, offices, and enterprise environments. However, individual wireless devices, such as Wi-Fi® devices, have inherent coverage limitations due to limited range of Wi-Fi® signals under current communication protocols. Thus, multiple wireless devices are deployed in a wireless mesh network to extend coverage and provide wireless connectivity across extended areas.

As wireless device deployments have expanded to meet growing connectivity demands, the available frequency spectrum has become increasingly congested. The commonly used 2.4 GHz and 5 GHz frequency bands host numerous overlapping networks, which may cause significant interference between neighboring wireless devices. Under ideal conditions, 2.4 GHz Wi-Fi® typically supports data rates up to 450 Mbps or 600 Mbps, while 5 GHz Wi-Fi® can achieve up to 1300 Mbps. However, in real-world environments with multiple competing devices and interference sources, the actual achievable data rates are substantially lower than the theoretical data rates. The spectrum congestion issue is particularly severe in dense deployment scenarios such as office buildings, residential complexes, and urban areas where multiple wireless networks operate in proximity. Existing solutions may include wired alternatives such as Ethernet or fiber optic networks that provide better connectivity without spectrum congestion in dense deployment scenarios. However, the wired alternatives are difficult to deploy across large campuses, multi-building complexes, and industrial environments and offer limited flexibility.

Furthermore, conventional wireless communication devices exacerbate spectrum congestion issues due to operational limitations. For example, the conventional wireless communication devices operate in a wireless local area network (WLAN) in half-duplex mode where the conventional wireless communication devices cannot transmit and receive data at the same time on the same frequency band. When a wireless communication device transmits data, the transmission signal blocks the wireless communication device from detecting incoming signals. The signal blockage creates a fundamental efficiency issue in congested networks where multiple wireless communication devices need to communicate at the same time. The half-duplex limitation forces wireless communication devices to compete for the same limited frequency resources using time-based access methods.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A wireless communication device and a method to operate the wireless communication device in a near-full duplex wireless mesh network, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF DRAWINGS

FIGS. 5A and 5B are diagrams that collectively illustrate a flowchart of a method for operating an exemplary wireless communication device in a near-full duplex wireless mesh network, in accordance with an embodiment of the disclosure.

DETAILED DESCRIPTION OF THE DISCLOSURE

Figure 1:
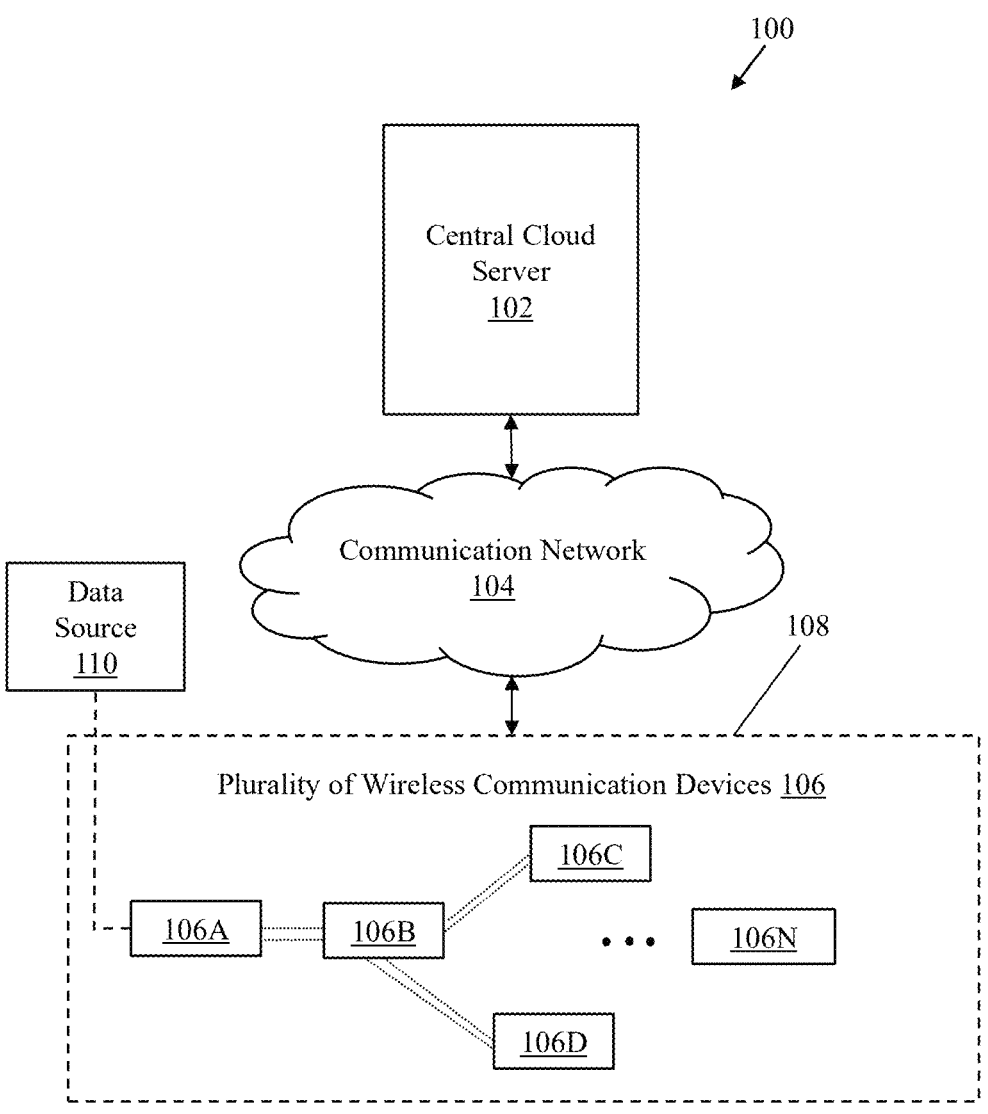
FIG. 1 is a diagram that illustrates an exemplary wireless communication system configured to operate an exemplary wireless communication device in a near-full duplex wireless mesh network, in accordance with an exemplary embodiment of the disclosure.

Certain embodiments of the disclosure may be found in a wireless communication device and a method to operate the wireless communication device in a near full duplex wireless mesh network.

In conventional wireless communication systems, standard Time Division Duplex (TDD) frame structure may operate by alternating radio frequency (RF) signal transmission and RF signal reception periods within a single frequency band. The standard TDD frame structure may utilize balanced time allocation ratios. The standard TDD frame structure may allocate approximately equal time periods for RF signal transmission and RF signal reception. For example, a 10-millisecond frame contains 5 milliseconds for downlink transmission and 5 milliseconds for uplink reception with guard periods between transitions. In conventional LTE TDD configuration, the frame structure may follow a specific pattern across ten 1-millisecond subframes. The standard TDD frame structure may result in approximately 60% downlink time and 40% uplink time allocation. The standard TDD approach may require the same wireless communication device to switch between transmission mode and reception mode on the same frequency. The switching may generate switching overhead and limits concurrent bidirectional communication capability. The conventional frame structure may utilize guard periods of 10-50 microseconds between transmission-to-reception transitions to prevent interference. However, the wireless communication device may only transmit or receive the RF signals at any given time instant, never both concurrently. Further, conventional Wi-Fi® systems may traditionally operate by use of Carrier Sense Multiple Access with Collision Avoidance (CSMA/CA) in a half-duplex manner. In CSMA/CA systems, the wireless communication devices may wait for channel access rather than using structured TDD frames.

Further, some conventional wireless communication systems attempt to address the TDD timing limitations within a single frequency band. The conventional wireless communication systems may allocate different spectrum portions for uplink and downlink with unequal time-bandwidth allocation. The conventional approaches may divide one frequency band into overlapping first and second portions with different spectrum bandwidths. However, the conventional approaches still face the fundamental limitation of operating in a half-duplex communication mode within a single frequency band. The single-band operation may restrict the ability to achieve true concurrent bidirectional communication.

The present disclosure solves the single-band limitations through a different approach. The wireless communication device may utilize two radio transceivers (e.g., a first wireless radio transceiver and a second wireless radio transceiver) that operate on different frequency bands. The first wireless radio transceiver may focus primarily on RF signal transmission operations on a first frequency band with a first TDD configuration. The second wireless radio transceiver may focus primarily on RF signal reception operations on a second frequency band with a second TDD configuration. A dual-band approach along with dual radio transceivers may enable near-concurrent bidirectional communication, which is not achievable with conventional single-band half-duplex wireless communication systems (e.g., conventional Wi-Fi® systems). For example, two radio transceivers within one wireless communication device exploit the fundamental limitation of conventional Wi-Fi® carrier sense mechanisms, which typically monitor only a single frequency band for interference detection. In the disclosed approach, the first wireless radio transceiver operates on a first frequency band (e.g., 2.4 or 5 GHz) while the second wireless radio transceiver operates on a second frequency band (e.g., 6 or 7 GHz). When a conventional Wi-Fi® device performs carrier sensing using CSMA/CA, it monitors the specific frequency band on which it intends to transmit. For example, if a conventional Wi-Fi® device is configured to transmit RF signals on the 2.4 GHz band, the carrier sense mechanism of the conventional Wi-Fi® device only detects RF energy and ongoing transmissions within that 2.4 GHz spectrum. The carrier sense mechanism remains unaware of concurrent transmissions occurring on different frequency bands, such as the 5, 6, or 7 GHz band. The two radio transceivers in the disclosed wireless communication device leverage the carrier sense mechanism limitation by coordinating transmissions across both frequency bands. The first wireless radio transceiver may transmit on the first frequency band while the second wireless radio transceiver concurrently receives on the second frequency band. The approach effectively creates "invisible" bidirectional communication from the conventional Wi-Fi® device perspective. The conventional system believes the Wi-Fi® device is dealing with standard half-duplex operation on a single band, while the two radio transceivers achieves near-concurrent bidirectional communication across two separate frequency bands. The carrier sense mechanism's inability to monitor multiple bands concurrently enables such dual-band deception, allowing the disclosed wireless communication device to bypass the fundamental half-duplex limitations of conventional Wi-Fi® systems.

Furthermore, the disclosed wireless communication device may utilize dual-polarized phased array antennas to communicate data on orthogonal polarizations. The orthogonal polarizations may reduce self-interference between RF signal transmission and RF signal reception operations on the different frequency bands. The disclosed wireless communication device uses dual-band approach with intelligent TDD coordination that enables the wireless communication device to achieve 80-90% full-duplex efficiency. The dual-band approach using the dual wireless radio transceivers may provide significant advantages over traditional single-band Wi-Fi® mesh networks. The disclosed wireless communication device achieves double aggregate throughput capacity from near-concurrent RF signal transmission and RF signal reception operations across both frequency bands. Conventional half-duplex systems may achieve only 50% capacity utilization at any given time by alternating between the RF signal transmission and the RF signal reception operations. The wireless communication device may maintain approximately 90% transmission capacity on the first frequency band while simultaneously maintaining 90% reception capacity on the second frequency band. The combined capacity utilization may achieve 80-90% full-duplex communication as compared to 40-50% half-duplex communication in conventional systems that alternate between the RF signal transmission and the RF signal reception. The near-concurrent operation may enable the wireless communication device to approach twice the effective throughput of conventional half-duplex wireless communication systems through coordinated dual-band operation.

Furthermore, the disclosed wireless communication device may include a processor that may be configured to execute a trained artificial neural network (ANN) model. Upon execution of the trained ANN model, the processor may be configured to predict a local data transmission demand and a local data reception demand based on historical data usage patterns. Further, the processor may dynamically adjust the first TDD configuration and the second TDD configuration on both frequency bands based on the local data transmission demand and the local data reception demand. The processor may also generate narrow beam patterns and implement beam hopping sequences to reduce interference. Specifically, the execution of the trained ANN models may enable intelligent coordination of the dual-band operation by analyzing the local data transmission demand and the local data reception demand and automatically adjusting the TDD configurations and the narrow beam patterns accordingly. Based on the local data transmission demand and the local data reception demand, the trained ANN model may predict time allocation ratios for the first TDD configuration and the second TDD configuration. The trained ANN model may determine beam steering directions and hopping sequences to minimize interference while maximizing signal strength.

FIG. 1 is a diagram that illustrates an exemplary wireless communication system for operating a wireless communication device in a near-full duplex wireless mesh network, in accordance with an exemplary embodiment of the disclosure. With reference to FIG. 1, there is shown a wireless communication system 100. The wireless communication system 100 may include a central cloud server 102, a communication network 104, and a plurality of wireless communication devices 106 (e.g., a first wireless communication device 106A, a second wireless communication device 106B, a third wireless communication device 106C, a fourth wireless communication device 106D and an Nth wireless communication device 106N). Further, there is shown a data source 110 connected to the first wireless communication device 106A. In an implementation, the plurality of wireless communication devices 106 may be referred to as a plurality of network nodes of a wireless mesh network 108 (interchangeably referred to as the near-full duplex wireless mesh network 108) of the wireless communication system 100.

The central cloud server 102 includes suitable logic, circuitry, and interfaces that may be configured to communicate with the plurality of wireless communication devices 106. In some examples, the central cloud server 102 may be a remote management server that is managed by a third party different from the service providers associated with the plurality of different wireless carrier networks (WCNs). In some examples, the central cloud server 102 may be a remote management server or a data center that may be managed by a third party, or jointly managed, or managed in coordination and association with the plurality of wireless communication devices 106. The central cloud server 102 may monitor overall network topology and connectivity status of the wireless mesh network 108. The central cloud server 102 may track which wireless communication devices are online or offline within the wireless mesh network 108. The central cloud server 102 may coordinate network-wide configuration updates and may manage device registration and authentication for the plurality of wireless communication devices 106.

The central cloud server 102 may acquire performance statistics from the plurality of wireless communication devices 106 and may generate network-wide performance reports. The central cloud server 102 may push firmware updates and distribute network configuration settings to the plurality of wireless communication devices 106. The central cloud server 102 may monitor network health and connectivity, may track device status and availability, and may generate alerts for device failures or disconnections in the wireless mesh network 108.

The communication network 104 includes a medium (e.g., a communication channel) through which the plurality of wireless communication devices 106 communicates with the central cloud server 102. The communication network 104 may be a wireless communication network. Examples of the communication network 104 may include, but are not limited to, a Wireless Local Area Network (WLAN), a wireless personal area network (WPAN), a wireless wide area network (WWAN), a wireless ad-hoc mesh network, or a WLAN wireless mesh network.

The plurality of wireless communication devices 106 may refer to network nodes of the wireless mesh network 108. Each wireless communication device of the plurality of wireless communication devices 106 may include two wireless radio transceivers and dual-polarized antennas to enable concurrent RF signal transmission and RF signal reception operations on different frequency bands. The plurality of wireless communication devices 106 may be equipped with one or more dual-polarized phased array patch antennas that may enable highly directional, high-gain communication between the plurality of network nodes while minimizing interference and extending operational range of each wireless communication device of the plurality of wireless communication devices 106. In some implementations, each wireless communication device of the plurality of wireless communication devices 106 may function as both a WLAN network node and a repeater node. Each wireless communication device of the plurality of wireless communication devices 106 may be either an MAP device or a slave AP device that are connected through bidirectional wireless links. Additionally, each wireless communication device of the plurality of wireless communication devices 106 may serve connected user devices while relaying data through the wireless mesh network 108.

Currently, in wireless local area network (WLAN) technology, the 2.4 GHz and 5 GHz frequency bands are congested spectrums with limited bandwidth availability. Existing Wi-Fi® networks encounter low quality of service (QoS) and performance limitations when running high-bandwidth applications. Such applications include 4K video streaming, virtual reality, or large file transfers requiring greater than 1 Gbps data rates. More advanced WLAN technology, like IEEE 802.11be (Wi-Fi® 7), may provide theoretical capacity of up to 30 Gbps under ideal conditions. However, practical scenarios typically achieve 5-10 Gbps due to interference, distance limitations, and bandwidth sharing among multiple users. Signal interference from nearby devices and appliances may disrupt signals and reduce throughput. Distance of wireless communication devices from a master access point may weaken signal strength and may impact achievable speeds. Sharing bandwidth among multiple users may further reduce individual device performance. Wi-Fi® 7 may aim to utilize up to 1.2 GHz spectrum resources in the 6 GHz band. However, effective utilization of frequency resources may require coexistence with technologies operating in the same band. Such technologies include IEEE 802.11ax and 5G on unlicensed bands. Coexistence among heterogeneous wireless networks may present significant challenges.

Beyond spectrum congestion challenges, the conventional wireless communication devices may face fundamental architectural limitations that may further restrict performance. The conventional wireless communication devices (e.g., Wi-Fi® devices) operate in half-duplex mode where wireless communication devices may not transmit RF signals and receive RF signals concurrently on the same frequency. During RF signal transmission, a wireless communication device's own signal may overwhelm the receiver, making detection of incoming signals impossible. The half-duplex limitation may worsen the spectrum efficiency issues by fundamentally reducing overall system capacity. Additionally, the conventional wireless communication devices may utilize Carrier Sense Multiple Access with Collision Avoidance (CSMA/CA) to manage access to the already limited shared medium. The conventional wireless communication devices may check for clear channels before the RF signal transmission of the data. When channels are busy, the conventional wireless communication devices may wait for random backoff periods. Checking for the clear channels before the RF signal transmission of the data may cause additional delays on top of existing spectrum limitations. Unlike wired networks using Carrier Sense Multiple Access with Collision Detection (CSMA/CD), the conventional wireless communication devices may not detect collisions during the RF signal transmission, further exacerbating efficiency issues.

The combined spectrum and architectural limitations result in significant deployment challenges for demanding applications. Legacy wireless communication devices face throughput variations, resilience issues, and implementation complexity. Latency and signal noise may present additional technical issues that may worsen as network density increases. Specifically, latency may increase when more wireless access points or relay nodes are introduced to extend communication range within the constrained spectrum. The collision avoidance mechanisms become increasingly problematic as network density grows. Collisions occur when multiple wireless communication devices attempt to transmit data concurrently on shared wireless channels. The RF signal transmission of the data concurrently on the shared wireless channels may result in corrupted data and reduced network performance that cannot meet the demands of modern high-bandwidth applications.

In contrast to conventional wireless communication systems, the present disclosure provides a near-full duplex (NFD) mesh network system (e.g., the wireless communication system 100). The wireless communication system 100 includes the plurality of wireless communication devices 106 that address both spectrum efficiency and architectural limitations of conventional WLAN communication systems. The plurality of wireless communication devices 106 may achieve near-full duplex communication through intelligent frequency band allocation and the coordination among the two wireless radio transceivers. The wireless communication system 100 may reduce deployment, maintenance, and energy costs while providing scalable architecture achieving performance comparable to wired solutions with wireless deployment flexibility and enhanced connectivity experience for demanding applications.

Figure 2:
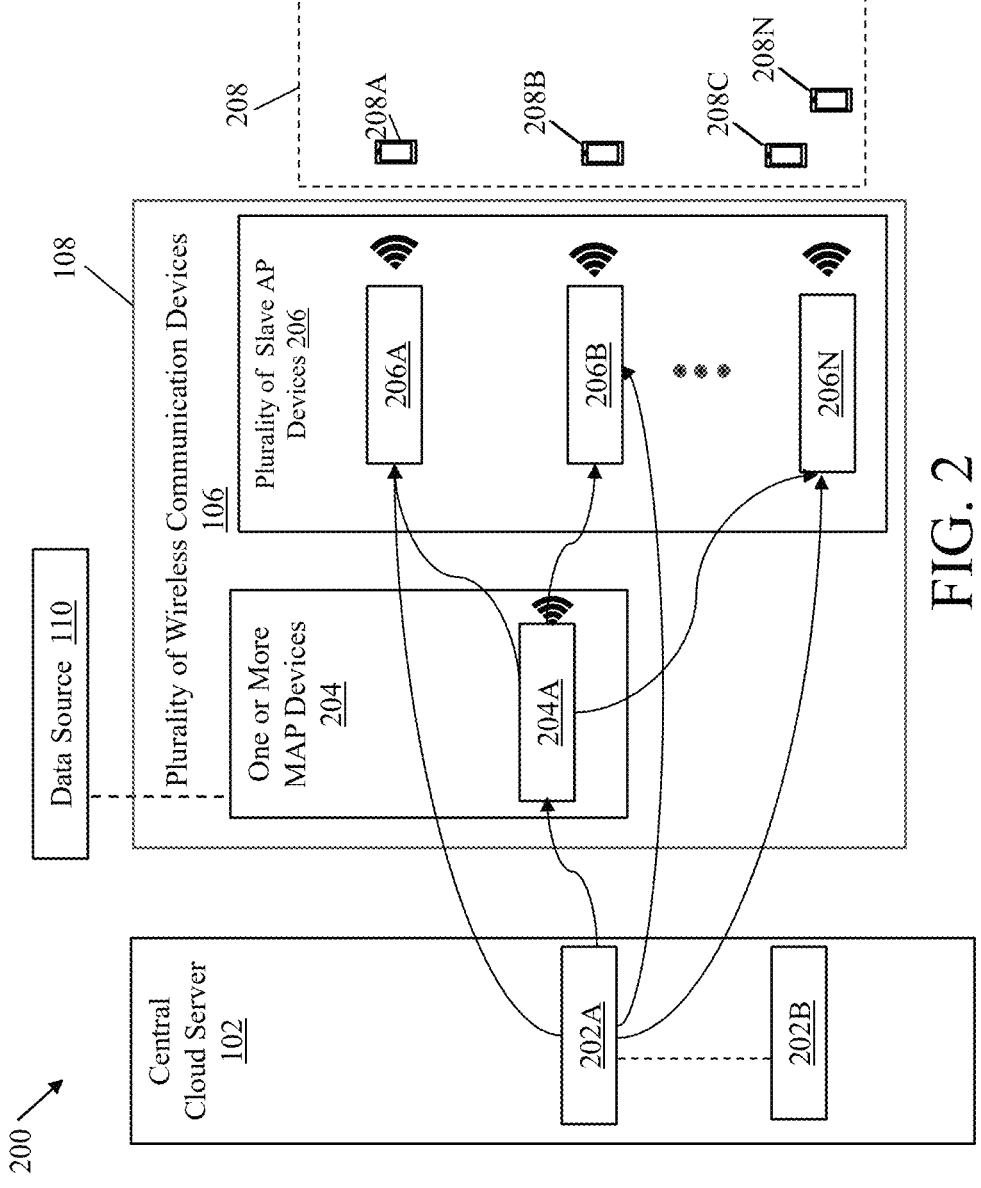
FIG. 2 is a diagram that illustrates an exemplary wireless communication system with a master access point (MAP) device and a plurality of slave AP devices, in accordance with an exemplary embodiment of the disclosure.

FIG. 2 is a diagram that illustrates an exemplary wireless communication system with a master access point (MAP) device and a plurality of slave access point (AP) devices, in accordance with exemplary embodiment of the disclosure. FIG. 2 is explained in conjunction with elements from FIG. 1. With reference to FIG. 2, there is shown an exemplary wireless communication system 200 to operate the plurality of wireless communication devices 106 in the near-full duplex wireless mesh network (e.g., the wireless mesh network 108).

The exemplary wireless communication system 200 may include the plurality of wireless communication devices 106 communicatively coupled with the central cloud server 102. The central cloud server 102 may include one or more processors, such as a processor 202A, and a trained artificial neural network (ANN) model 202B. Further, the plurality of wireless communication devices 106 may include one or more master access point (MAP) devices 204 (e.g., a MAP device 204A), and a plurality of slave AP devices 206 (e.g., a first slave AP device 206A, a second slave AP device 206B up to an Nth slave AP device 206N). The plurality of wireless communication devices 106 may be communicatively coupled with one or more user equipment 208 (e.g., a first user equipment (UE) 208A, a second UE 208B, a third UE 208C up to an nth UE 208N).

The processor 202A of the central cloud server 102 may include suitable logic, circuitry, and interfaces that may be configured to receive network performance metrics from the plurality of wireless communication devices 106. The plurality of wireless communication devices 106 may transmit performance data including throughput measurements, latency statistics, interference levels, and device utilization patterns to the central cloud server 102 via the communication network 104 (of FIG. 1). The processor 202A may be configured to aggregate the performance metrics from the plurality of wireless communication devices 106 to identify network-wide trends, bottlenecks, and optimization opportunities across the wireless mesh network 108. The processor 202A may analyze global traffic patterns and network topology information to generate network-level recommendations for improved mesh network performance. In an implementation, the processor 202A may be configured to distribute firmware updates, security patches, and global configuration parameters to the wireless communication devices 106 through the communication network. In another implementation, the processor 202A may provide centralized storage and management of the trained ANN model 202B that may be downloaded to individual wireless communication devices for local execution of AI/ML optimization functions. Examples of the processor 202A of the central cloud server 102 may include but are not limited to a central processing unit (CPU), graphical processing unit (GPU), a Reduced Instruction Set Computing (RISC) processor, an Application-Specific Integrated Circuit (ASIC) processor, a Complex Instruction Set Computing (CISC) processor, and/or other processors, or state machines.

The trained ANN model 202B of the central cloud server 102 may be periodically (e.g., daily and for different times-of-day) trained on historical data usage patterns (e.g., traffic pattern forecasts and channel condition predictions) uploaded to the central cloud server 102 by one or more network nodes, such as the one or more MAP devices 204, and/or the plurality of wireless communication devices 106. The trained ANN model 202B may generate the local data transmission demand and the local data reception demand of the wireless mesh network 108 based on the historical data usage pattern to determine uplink duration and downlink duration ratios. Further, the trained ANN model 202B may generate channel condition predictions for upcoming time periods to adjust TDD parameters in extended WLAN beacons. In an implementation, the trained ANN model 202B may include Autoregressive Integrated Moving Average (ARIMA) model configured to forecast traffic patterns based on historical data, Long Short-Term Memory (LSTM) neural network configured to predict channel conditions for sequence prediction, or Deep Deterministic Policy Gradient (DDPG) model configured for reinforcement learning-based TDD parameter optimization. In some examples, the trained ANN model 202B may include a decision tree or a regression model configured to predict defined TDD configurations based on network traffic patterns and channel conditions.

The MAP device 204A may include suitable logic, circuitry, and interfaces that may be configured to provide gateway functionality for the wireless mesh network 108. Further, the MAP device 204A may be configured to coordinate frequency band allocation for asymmetric TDD synchronization across the wireless mesh network 108. In some implementations, the MAP device 204A may be configured to implement Wi-Fi® 7 with the TDD configurations and the one or more dual-polarized phased array patch antennas to enable highly directional, high-gain communication with slave nodes while minimizing interference and extending operational range. The MAP device 204A may be further configured to analyze network traffic patterns, predict beam directions, and detect anomalies in network performance. Further, the MAP device 204A may be further configured to trigger self-healing actions including dynamic resource allocation, beam steering optimization, and network topology reconfiguration. Examples of the MAP device 204A may include, but may not be limited to, an AI-enhanced Wi-Fi® 7 wireless access point with phased array antenna capability, an intelligent wireless gateway device with near-full duplex functionality, a cognitive wireless router with dual-polarized antenna systems, an AI-optimized network controller with beam steering capabilities, a smart wireless bridge with asymmetric TDD management, a self-healing wireless network hub with predictive maintenance capabilities, or combinations thereof.

The plurality of slave AP devices 206 may include suitable logic, circuitry, and interfaces that may be configured to communicate with the MAP device 204A and/or different slave devices via wireless links and implement near-full duplex communication by the RF signal transmission and the RF signal reception of the data concurrently on different frequency bands within the wireless mesh network 108. Each slave AP device of the plurality of slave AP devices 206 may be configured to execute the trained ANN model 202B to adjust local link parameters, implement asymmetric TDD, and coordinate with global optimization directives of the MAP device 204A. In some embodiments, each slave AP device may be configured to access the trained ANN model 202B from the central cloud server 102 for the execution of the trained ANN model 202B. In some cases, each slave AP device may download the trained ANN model 202B from the central cloud server 102. Each slave AP device (e.g., the first slave AP device 206A) may implement Wi-Fi® 7 radios configured to operate on at least two frequency bands with independent TDD configurations. Examples of the plurality of slave AP devices 206 may include, but may not be limited to, AI-enhanced Wi-Fi® 7 access points with dual-polarized phased array capabilities, wireless communication devices with near-full duplex functionality, cognitive network nodes with beam steering optimization, smart wireless nodes with asymmetric TDD management, self-optimizing mesh nodes with predictive link adaptation, or adaptive wireless nodes with cross-polarization isolation capabilities, or one or more combinations thereof.

Each of one or more UEs 208 may refer to the wireless communication device, such as a client device or a telecommunication hardware used by an end-user to communicate within the synchronized wireless mesh network. Some of the one or more UEs 208 may refer to a combination of a mobile equipment and subscriber identity module (SIM). Examples of the one or more UEs 208 may include, but are not limited to a smartphone, a laptop, a desktop machine, a customer premise equipment, a virtual reality headset, an augmented reality device, a wireless modem, a home router, a Wi-Fi® 7 enabled smart television (TV) or set-top box, a VoIP station, or any different customized hardware for wireless communication.

In an implementation, the data source 110 of the plurality of wireless communication devices 106 may be one or more of an optical fiber port connected to an optical fiber for an Internet connection, an Ethernet port connected to an Ethernet cable for the Internet connection, or a Wi-Fi® 7 signal received from a radio access network (RAN) node, or a satellite antenna. As illustrated in the embodiment of FIG. 2, the data source 110 may be communicatively coupled with the one or more MAP devices 204 (e.g., the MAP device 204A).

Figure 3:
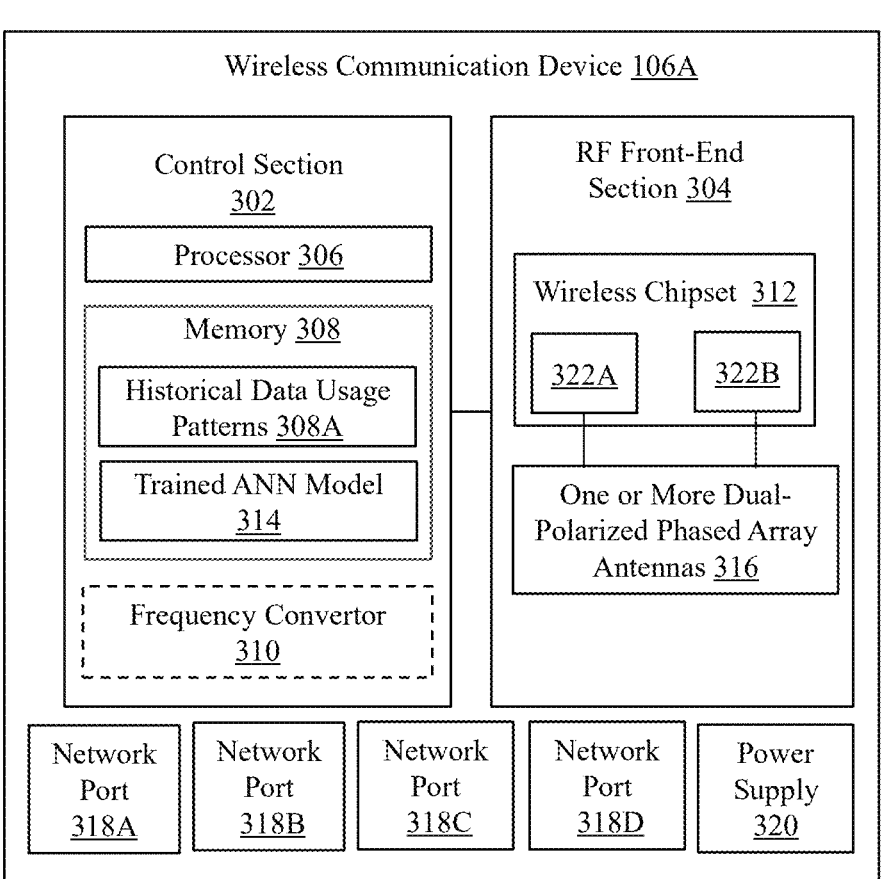
FIG. 3 is a block diagram that illustrates various components of an exemplary wireless communication device, in accordance with an exemplary embodiment of the disclosure.

FIG. 3 is a block diagram that illustrates various components of an exemplary wireless communication device, in accordance with an exemplary embodiment of the disclosure. FIG. 3 is explained in conjunction with elements from FIGS. 1 and 2. With reference to FIG. 3, there is shown a block diagram 300 that illustrates various components of the wireless communication device (e.g., the first wireless communication device 106A). The first wireless communication device 106A may correspond to the plurality of wireless communication devices 106.

The first wireless communication device 106A may include a control section 302 and a front-end RF section 304. The control section 302 may include a processor 306 and a memory 308. The memory 308 may be configured to store historical data usage patterns 308A and a trained ANN model 314. In an implementation, the control section 302 may include a frequency converter 310. In some implementations, the frequency converter 310 may not be provided. The front-end RF section 304 may include a wireless chipset 312, which may include a first wireless radio transceiver 322A and a second wireless radio transceiver 322B.

In some implementations, the wireless communication device (e.g., the first wireless communication device 106A) may be modified to further include the one or more dual-polarized phased array antennas 316. The one or more dual-polarized phased array antennas 316 may include a first antenna for receiving the RF signals and a second antenna for transmitting the RF signals configured for each of the first wireless radio transceiver 322A and the second wireless radio transceiver 322B. The wireless communication device (e.g., the first wireless communication device 106A) may further include a plurality of network ports, such as a first network port 318A, a second network port 318B, a third network port 318C and a fourth network port 318D, and a power supply 320. The processor 306 may be communicatively coupled to the memory 308, the frequency converter 310 (when provided), and the different components of the front-end RF section 304 of the wireless communication device (e.g., the first wireless communication device 106A).

The processor 306 of the first wireless communication device 106A may refer to a computational processing unit configured to execute instructions and perform data processing operations within the first wireless communication device 106A. The processor 306 may include hardware components configured to execute software programs, manage device operations, and coordinate communication functions between different components of the first wireless communication device 106A. The processor 306 may be configured to process digital signals and execute the trained ANN model 314. The processor 306 makes real-time decisions based on input data received from various sensors and communication interfaces within the first wireless communication device 106A. The processor 306 may include memory interfaces configured to access stored data and program instructions from the memory 308 of the first wireless communication device 106A. The processor 306 may further include input/output interfaces configured to communicate with the first wireless radio transceiver 322A, the second wireless radio transceiver 322B, and the one or more dual-polarized phased array antennas 316. Examples of the processor 306 of the first wireless communication device 106A may include but are not limited to a central processing unit (CPU), graphical processing unit (GPU), a Reduced Instruction Set Computing (RISC) processor, an Application-Specific Integrated Circuit (ASIC) processor, a Complex Instruction Set Computing (CISC) processor, and/or other processors, or state machines.

The memory 308 may include suitable logic, circuitry, and/or interfaces that may be configured to store instructions executable by the processor 306. The memory 308 may temporarily store and update the historical data usage patterns 308A, which may be periodically communicated to the central cloud server 102. Examples of implementation of the memory 308 may include, but are not limited to, random access memory (RAM), dynamic random access memory (DRAM), static random access memory (SRAM), processor cache, thyristor random access memory (T-RAM), zero-capacitor random access memory (Z-RAM), read only memory (ROM), hard disk drive (HDD), secure digital (SD) card, flash drive, cache memory, and/or other non-volatile memory.

In some embodiments, the memory 308 may further be configured to store the trained ANN model 314. In some embodiments, the processor 306 may be configured to obtain the trained ANN model 202B from the central cloud server 102. The processor temporarily stores the model in the memory 308 as the trained ANN model 314 (i.e., a local copy of the trained ANN model 202B). In some embodiments, the trained ANN model 314 may be prestored in the memory 308. Upon execution of the trained ANN model 314, the processor 306 may be configured to periodically analyze data points (e.g., traffic pattern analysis, beam steering performance data, and channel condition assessments). The data points may be uploaded to the central cloud server 102 by one or more network nodes, in the wireless mesh network 108. The processor 306 may continuously or periodically analyze network traffic to determine duty cycle ratios of asymmetric TDD between the first frequency band and the second frequency band. The trained ANN model 314 may assess dual-band channel conditions for upcoming time periods. Based on the assessment, the trained ANN model 314 may dynamically adjust asymmetric TDD parameters and piecewise narrow beam hopping sequences for Wi-Fi® 7 radios with independent TDD configurations.

In an implementation, the trained ANN model 314 may include Long Short-Term Memory (LSTM) networks configured to learn the historical data usage patterns 308A to forecast future demand. In some examples, the trained ANN model 314 may include Autoencoders that may be configured for anomaly detection by reconstructing input data where deviations indicate anomalies. In some examples, the trained ANN model 314 may include One-Class Support Vector Machines (OCSVM) configured to identify anomalies by constructing boundaries around normal data points. In some examples, the trained ANN model 314 may include Bayesian Networks that may be configured to model causal relationships between events of the wireless mesh network 108 for root cause analysis of detected anomalies.

The frequency converter 310 may be configured to up convert or down convert one radio frequency to different radio frequency of an RF signal. For example, the wireless communication device (e.g., the first wireless communication device 106A) may utilize the frequency converter 310 to convert a WLAN signal to a beam of RF signals in an intermediate frequency band (e.g., mmWave frequencies or different intermediate frequencies in the range of 10-300 GHz). The frequency converter 310 may perform frequency up conversion by frequency mixing of the WLAN signal with a local oscillator signal to generate an intermediate frequency (e.g., mmWave frequencies or different intermediate frequencies in the range of 10-300 GHz) for improved wireless communication performance. In some embodiments, the frequency converter 310 may include a phase locked loop (PLL) circuit, which may act as a local oscillator. For example, the frequency converter 310 may perform frequency up-conversion through double-sideband suppressed-carrier mixing. In such a process, the WLAN signal at 6 GHz is mixed with a local oscillator signal generated by the phase-locked loop (PLL) circuit operating, for example, at 34 GHz. The frequency converter 310 may generate intermediate frequency (IF) signals at 28 GHz and 40 GHz. The wireless communication system 100 may utilize the 28 GHz intermediate frequency, selected through a bandpass filter with center frequency at 28 GHz, 3-dB bandwidth of 2 GHz, and stopband attenuation greater than 40 dB at ±4 GHz from center frequency. The PLL circuit maintains frequency stability of ±10 ppm using a 10 MHz temperature-compensated crystal oscillator (TCXO) reference. The circuit operates with a loop bandwidth of 100 kHz and phase noise performance of −90 dBs/Hz at 10 kHz offset from the 34 GHz carrier. The frequency conversion process may preserve the 320 MHz bandwidth of the WLAN signal while translating the carrier frequency to the intermediate frequency band to enable analog RF bridging through the wireless mesh network 108 without digital baseband processing at intermediate nodes.

The wireless chipset 312 may be a hardware component including Wi-Fi® 7 RF transceivers (e.g. the first wireless radio transceiver 322A and the second wireless radio transceiver 322B) responsible for implementing near-full duplex communication through coordinated asymmetric TDD configurations across multiple frequency bands. In some embodiments, the wireless chipset 312 may support dual-band operation. The dual-band operation may include the first frequency band (e.g., 6 GHz) configured for downlink transmission with 90% duty cycle allocation and the second frequency band (e.g., 5 GHz) configured for uplink reception with 90% duty cycle allocation. The wireless chipset 312 processes asymmetric TDD configurations to achieve near-full duplex operation. The processing may include Multi-Link Operation (MLO) coordination, Transmission Opportunity (TXOP) allocation parameters within the Wi-Fi® 7 Enhanced Distributed Channel Access (EDCA) framework, and Traffic Identifier (TID)-to-link mapping mechanisms. The wireless chipset 312 may implement independent Medium Access Control (MAC) layer and Physical (PHY) layer operations dedicated to each frequency band. The implementation of Medium Access Control (MAC) layer and Physical (PHY) may enable concurrent RF signal transmission on the first frequency band while the RF signal reception on the second frequency band to reduce self-interference at the wireless communication device (e.g., the first wireless communication device 106A).

The one or more dual-polarized phased array antennas 316 may be configured to steer beams electronically to establish directional communication links and generate a plurality of narrow beam patterns for enhanced spatial separation and interference mitigation. The narrow beam patterns refer to a beamwidth ranging from 10 degrees to 30 degrees. Beam steering may refer to the electronic control of antenna beam direction without physical movement of the antenna elements. The beam steering may be achieved by adjusting phase relationships between individual antenna elements in the phased array. The plurality of narrow beam patterns refers to the directional radio frequency signal patterns with beamwidth ranging from 10 degrees to 30 degrees. The radio frequency signal patterns focus transmitted energy in specific directions while minimizing signal spread to unwanted areas. The one or more dual-polarized phased array antennas 316 (such as the first antenna for receiving the RF signals and the second antenna for transmitting the RF signals) may enable highly directional and high-gain communication between the wireless communication device (e.g., the first wireless communication device 106A) and the one or more different wireless communication devices of the plurality of wireless communication devices 106.

In some embodiments, the one or more dual-polarized phased array antennas 316 may maintain cross-polarization isolation of at least 20 dB between the orthogonal polarizations. The cross-polarization isolation refers to the degree of signal separation achieved between orthogonal polarization channels of the one or more dual-polarized phased array antennas 316. The cross-polarization isolation may measure how effectively the RF signals transmitted on a first polarization orientation are prevented from interfering with signals received on a second polarization orientation that is perpendicular to the first polarization orientation. The cross-polarization may facilitate implementation of a coordinated null steering to suppress interference between concurrent RF signal transmission and RF signal reception operations. Null steering may refer to an operation where the one or more dual-polarized phased array antennas 316 electronically direct antenna nulls toward sources of interference. The antenna nulls may refer to areas of minimal signal strength. The null steering may suppress unwanted signals from specific directions while maintaining strong RF signal reception from defined directions.

In some embodiments, the wireless communication device (e.g., the first wireless communication device 106A) may utilize the one or more dual-polarized phased array antennas 316 (such as a first antenna for the RF signal reception and a second antenna for the RF signal transmission) to execute piecewise narrow beam hopping sequences. The piecewise narrow beam hopping may refer to an operation where the one or more dual-polarized phased array antennas 316 rapidly switch between multiple narrow beam patterns in a time-sequenced manner. The piecewise narrow beam hopping may generate virtual mini-time slots within each TDD cycle to further reduce self-interference. The piecewise narrow beam hopping sequences may be executed by rapidly switching between the plurality of narrow beam patterns according to a determined hopping sequence. The determined hopping sequence may refer to a defined pattern that specifies an order and timing for switching between the plurality of narrow beam patterns. The determined hopping sequence may be optimized to minimize interference and maximize communication efficiency. The hopping sequence may be dynamically adjusted based on network conditions detected through processor-controlled analysis.

The one or more dual-polarized phased array antennas 316 may coordinate beam directions such that RF signal transmission beams on the first frequency band and reception beams on the second frequency band maintain spatial separation of at least 30 degrees. The spatial separation may refer to an angular distance maintained between RF signal transmission beam directions and RF signal reception beam directions to minimize interference between the concurrent RF signal transmission and reception operations. The spatial separation of at least 30 degrees may ensure that the RF signal transmission beams on the first frequency band may not overlap with reception beams on the second frequency band. Beam coordination may refer to the synchronized control of multiple beam directions to improve communication performance while maintaining the required spatial separation. The beam coordination may enable the wireless communication device to transmit the RF signals on the first frequency band while concurrently receiving the RF signals on the second frequency band without significant interference between the RF signal transmission beams and the RF signal reception beams. The spatial separation may be electronically controlled through phase adjustments of the individual antenna elements in the one or more dual-polarized phased array antennas 316.

The first network port 318A may be an optical fiber port. The second network port 318B may be an Ethernet port. The third network port 318C may be a WLAN Fast Ethernet (FE) port. The fourth network port 318D may be a USB port. The power supply 320 may be configured to provide power to the various components of the wireless communication device (e.g., the first wireless communication device 106A).

In operation, the first wireless radio transceiver 322A may be configured to operate on the first frequency band with the first TDD configuration that allocates more time for the RF signal transmission than the RF signal reception. The first wireless radio transceiver 322A may initiate operation on the first frequency band by establishing an independent Medium Access Control (MAC) layer and Physical (PHY) layer that are separate from the second wireless radio transceiver 322B. The MAC layer and the PHY layer are dedicated to the first frequency band through Wi-Fi® 7 Multi-Link Operation (MLO) framework. The MAC layer of the first wireless radio transceiver 322A may function as a traffic controller in the wireless mesh network 108. The MAC layer of the first wireless radio transceiver 322A may decide when the one or more dual-polarized phased array antennas 316 communicates data, manages channel access protocols, schedules data frames, and coordinates with one or more wireless communication devices to avoid collisions. The PHY layer of the first wireless radio transceiver 322A may operate as the actual radio interface that converts digital data into the RF signals for the RF signal transmission through the one or more dual-polarized phased array antennas 316. The PHY layer of the first wireless radio transceiver 322A may convert received RF signals back into digital data.

Further, the first wireless radio transceiver 322A may access a Wi-Fi® 7 Enhanced Distributed Channel Access (EDCA) framework through the MAC layer to generate the first TDD configuration. The MAC layer of the first wireless radio transceiver 322A may modify the TXOP allocation parameters within the EDCA framework by programming a first defined interval and a second defined interval. For example, 90% of each operational frame duration for downlink transmission periods and 10% for uplink reception periods. Each TXOP may represent a defined time interval during which the first wireless radio transceiver 322A may have exclusive access to a wireless medium for the RF signal transmission of the data without interference from the one or more different wireless communication devices of the plurality of wireless communication devices 106. The first wireless radio transceiver 322A may execute the asymmetric time allocation by sending control signals from the MAC layer to the PHY layer. When the control signals are sent from the MAC layer to the PHY layer, a transmission mode may be activated during first defined periods (i.e., the downlink transmission periods). The execution of the asymmetric time allocation may cause the PHY layer to generate electrical signals. Further, the execution of the asymmetric time allocation coordinate may cause the PHY layer to convert the electrical signals into electromagnetic waves for RF signal transmission on the first frequency band.

In accordance with an embodiment, the first wireless radio transceiver 322A may transition to RF signal reception periods from RF signal transmission periods by sending control signals from the MAC layer to the PHY layer to activate the reception mode during the second defined periods (i.e., the uplink reception periods). The activation of the reception mode may enable the PHY layer to coordinate with the one or more dual-polarized phased array antennas 316 to capture incoming electromagnetic waves and convert the incoming electromagnetic waves back into the electrical signals for RF signal reception on the first frequency band. The first wireless radio transceiver 322A may maintain the asymmetric time allocation by continuously repeating the transmission-reception cycle with Short Interframe Space (SIFS) periods to serve as guard intervals between mode transitions. The SIFS periods may enable allocation of more time for the RF signal transmission than the RF signal reception on the first frequency band through the first TDD configuration.

In accordance with an embodiment, the second wireless radio transceiver 322B may be configured to operate on the second frequency band with the second TDD configuration. The second TDD configuration may allocate more time for the RF signal reception than the RF signal transmission. The second wireless radio transceiver 322B may initiate operation on the second frequency band by establishing an independent Medium Access Control (MAC) layer and a Physical (PHY) layer dedicated to the second frequency band through Wi-Fi® 7 Multi-Link Operation (MLO) framework. The second wireless radio transceiver 322B may establish communication with the one or more dual-polarized phased array antennas 316 to coordinate reception of the RF signals via antenna elements that have vertical polarization. The second wireless radio transceiver 322B may further maintain coordination with the first wireless radio transceiver 322A that utilizes horizontal polarization. The second wireless radio transceiver 322B may access the Wi-Fi® 7 Enhanced Distributed Channel Access (EDCA) framework through the MAC layer to generate the second TDD configuration that operates complementary to the first wireless radio transceiver 322A.

In accordance with an embodiment, the MAC layer of the second wireless radio transceiver 322B may be configured to modify the TXOP allocation parameters within the EDCA framework by programming complementary asymmetric time allocation where a first determined portion of each operational frame duration is dedicated to the uplink reception periods and a second determined portion of each operational frame duration is reserved for the downlink transmission periods. The first determined portion is substantially larger than the second determined portion. For example, 10% of each operational frame duration for downlink transmission periods and 90% for uplink reception periods. Each TXOP may represent a defined time interval during which the second wireless radio transceiver 322B may have exclusive access to the wireless medium for the RF signal reception or the RF signal transmission of the data without interference from the one or more different wireless communication devices of the plurality of wireless communication devices 106. The second wireless radio transceiver 322B may execute the asymmetric time allocation by sending control signals from the MAC layer to the PHY layer to instruct activation of the reception mode during the first determined portion of each operational frame duration. The activation of the reception mode may cause the PHY layer to coordinate with the one or more dual-polarized phased array antennas 316 that may have vertical polarization. The coordination may facilitate capture of incoming electromagnetic waves and convert the incoming electromagnetic waves into electrical signals for the RF signal reception on the second frequency band. The second wireless radio transceiver 322B may be configured to transition to the transmission periods by sending control signals from the MAC layer to the PHY layer. The control signals may instruct activation of the transmission mode during the second determined portion of each operational frame duration. The activation of the second determined period may cause the PHY layer to generate electrical signals and coordinate with the one or more dual-polarized phased array antennas 316 that may have the vertical polarization. The coordination may facilitate conversion of the electrical signals into electromagnetic waves for the RF signal transmission on the second frequency band. The second wireless radio transceiver 322B may be configured to coordinate timing synchronization with the first wireless radio transceiver 322A through the Wi-Fi® 7 MLD framework. The coordination may ensure that the first wireless radio transceiver 322A operates in the transmission mode on the first frequency band and the second wireless radio transceiver 322B may operate in the reception mode on the second frequency band, to achieve near-concurrent bidirectional communication.

In accordance with an embodiment, the second wireless radio transceiver 322B may be configured to maintain the asymmetric time allocation by continuously or periodically repeating the RF signal reception-transmission cycle with Short Interframe Space (SIFS) periods. The SIFS period serves as a guard interval between the transition of the RF signal reception period and the transmission period. Advantageously, the SIFS periods allocate more time for the RF signal reception than the RF signal transmission on the second frequency band through the second TDD configuration that dedicates substantially more operational time to reception while maintaining minimal transmission capacity for acknowledgment signals and control information.

In accordance with an embodiment, the processor 306 may be configured to execute the trained ANN model 314 on the historical data usage patterns 308A at the wireless communication device (the first wireless communication device 106A) to predict a local data transmission demand and a local data reception demand. The historical data usage patterns 308A may be stored in the memory 308 of the processor 306. The historical data usage patterns 308A may include network performance metrics and communication activity records collected over time at the wireless communication device (e.g., the first wireless communication device 106A) within the wireless mesh network 108. In some implementations, the historical data usage patterns 308A may include asymmetric TDD duty cycle efficiency measurements between the first frequency band and second frequency band. The TDD duty cycle efficiency measurements may refer to the actual utilization ratios and performance outcomes of the coordinated TDD configurations during various operational periods. The historical data usage patterns 308A may include beam steering performance metrics captured from the one or more dual-polarized phased array antennas 316. The beam steering performance metrics may include signal strength measurements, cross-polarization isolation effectiveness, spatial separation accuracy, and beam pattern optimization results across different communication scenarios with the one or more different wireless communication devices of the plurality of wireless communication devices 106. The historical data usage patterns 308A may include traffic flow analysis data that documents the volume, timing, and directional characteristics of the RF signal transmission and the RF signal reception operations of the data. The RF signal reception operations may include peak usage periods, idle intervals, and recurring communication patterns that emerge across the wireless mesh network 108. Additionally, the historical data usage patterns 308A may also include network performance indicators such as throughput measurements, latency recordings, packet delivery ratios, and signal-to-noise ratio variations. The historical data usage patterns 308A may include interference levels detected during various network conditions and environmental scenarios.

In an implementation, the trained ANN model 314 may be configured to analyze the historical data usage patterns 308A to identify recurring temporal patterns, seasonal variations that characterize the local data transmission demand and the local data reception demand of the wireless communication device (e.g., the first wireless communication device 106A). In some implementation, the historical data usage patterns 308A may include daily peak usage periods when the wireless communication device (e.g., the first wireless communication device 106A) requires enhanced downlink transmission capacity on the first frequency band. In some implementations, the historical data usage patterns 308A may include defined intervals when uplink reception demand increases on the second frequency band based on network traffic flows and user activity cycles.

In some implementations, the trained ANN model 314 may include a Long Short-Term Memory (LSTM) network with three hidden layers trained on the historical data usage patterns 308A. In an example, the trained ANN model 314 may receive input vectors of dimension representing time-series data with 15-minute intervals over 12-hour windows. Each input vector may contain multiple input elements. Each input element includes normalized values for throughput (expressed in Mbps), latency (expressed in milliseconds), packet loss ratio (expressed in percentage), and beam steering success rate (expressed in percentage). The LSTM may process the input elements through sigmoid activation functions $[\sigma(x)=1/(1+e^{-x})]$ and tanh activation functions $[\tanh(x)=(e^x-e^{-x})/(e^x+e^{-x})]$ to generate output predictions for duty cycle ratios of the first and second TDD configuration. For example, when the training is performed using backpropagation through time (BPTT) operation with learning rate $\alpha=0.001$ and batch size of 32 samples. The trained ANN model 314 may achieve prediction accuracy of 85% for traffic pattern forecasting. The accuracy may be measured by mean absolute percentage error (MAPE) less than 15% when validated against test datasets including 30 days of network performance data.

In accordance with an embodiment, the processor 306 may be configured to execute the trained ANN model 314 to perform prediction operations that include examination of historical TDD performance data. The examination of historical TDD performance data may facilitate determination of duty cycle allocations that have previously delivered near-full duplex communication efficiency. The determination of duty cycle allocations may enable the trained ANN model 314 to forecast future transmission and reception demand scenarios. The processor 306 may correlate historical beam steering effectiveness data with environmental conditions and network topology changes. The trained ANN model 314 may predict the TDD configurations of the one or more dual-polarized phased array antennas 316 for upcoming communication demands.

In accordance with an embodiment, the processor 306 may be configured to execute the trained ANN model 314 to generate the local data transmission demand and the local data reception demand predictions. The local data transmission demand and the local data reception demand predictions may refer to forecasts of future communication requirements specific to the wireless communication device (e.g., the first wireless communication device 106A) based on analysis of the historical usage patterns. The processor 306 may process multiple data streams from the historical data usage patterns 308A. The data streams may refer to different types of network performance data collected simultaneously from various sources within the wireless communication device (e.g., the first wireless communication device 106A). The processor 306 may analyze the historical data usage patterns 308A where transmission-heavy allocation of the first TDD configuration may have been effective. The transmission-heavy allocation may refer to TDD configurations (e.g., the first TDD configuration) that allocate more time for the RF signal transmission operations than the RF signal reception operations on the first frequency band. The processor 306 may correlate the historical data usage patterns 308A with temporal factors, network load conditions, and communication partner characteristics. The temporal factors may refer to time-based patterns such as daily usage cycles, peak hours, and seasonal variations that influence network demand. The network load conditions may refer to the amount of data traffic and number of active connections affecting the performance of the wireless communication device (e.g., the first wireless communication device 106A). The communication partner characteristics may refer to properties of connected devices such as distance, signal strength requirements, and data transfer patterns. The processor 306 may predict future scenarios requiring similar transmission-heavy configurations. Concurrently, the processor 306 may process the historical data usage patterns 308A regarding reception-heavy allocation of the second TDD configuration. The reception-heavy allocation may refer to TDD configurations that allocate more time for the RF signal reception operations than the RF signal transmission operations on the second frequency band. The processor 306 may forecast periods when the wireless communication device (e.g., the first wireless communication device 106A) may experience increased reception demand from different network nodes.

In accordance with an embodiment, the processor 306 may be configured to execute the trained ANN model 314 to predict beam steering parameters by analyzing the historical data usage patterns 308A. Beam steering parameters may refer to defined settings that control the direction, focus, and characteristics of radio frequency beams generated by the one or more dual-polarized phased array antennas 316. Upon the execution of the trained ANN model 314, the processor 306 may correlate the TDD configurations of the one or more dual-polarized phased array antennas 316 with successful communication outcomes. Successful communication outcomes may refer to instances where the wireless communication device (e.g., the first wireless communication device 106A) achieved target performance metrics such as defined throughput, acceptable latency, and minimal packet loss during communication sessions. The prediction operations may include forecasting cross-polarization isolation requirements and spatial separation needs. The cross-polarization isolation requirements may refer to a minimum level of signal separation needed between orthogonal polarization channels to prevent interference during concurrent transmission and reception operations. Spatial separation needs may refer to a minimum angular distance required between the transmission beams and the reception beams to maintain communication quality. The forecasting may be based on historical interference patterns and network topology data. The historical interference patterns may refer to recorded instances of signal interference and characteristics of the signal interference over time at the wireless communication device (e.g., the first wireless communication device 106A). The network topology data may refer to information about arrangement, connections, and relationships between the plurality of wireless communication devices 106 in the wireless mesh network 108. The forecasting of the cross-polarization isolation requirements and the spatial separation may enable the processor 306 to adjust orthogonal polarization for predicted communication scenarios. The predicted communication scenarios may refer to anticipated future network conditions and communication requirements based on analysis of the historical data usage patterns 308A. The prediction capabilities of the trained ANN model 314 may enable the wireless communication device (e.g., the first wireless communication device 106A) to achieve enhanced near-full duplex communication efficiency.

In accordance with an embodiment, the processor 306 may be configured to adjust the first TDD configuration and the second TDD configuration based on the local data transmission demand and the local data reception demand. TDD configuration adjustment may refer to a modification of time allocation ratios between the RF signal transmission and the RF signal reception periods on each frequency band to match predicted communication requirements. The processor 306 may receive the local data transmission demand and the local data reception demand predictions from the trained ANN model 314. The processor 306 may analyze the predictions to determine defined duty cycle modifications. The duty cycle modifications may refer to changes in the percentage of time allocated for the RF signal transmission versus the RF signal reception operations within each TDD cycle. The processor 306 may determine current allocations of TDD configuration against predicted demand requirements. The current allocations may refer to present time distribution settings for the RF signal transmission and the RF signal reception periods on the first and second frequency bands. The predicted demand requirements may refer to the anticipated communication needs forecasted by the processor 306 based on historical data analysis. The processor 306 may identify scenarios where RF signal transmission demand exceeds the capacity of the first TDD configuration. The transmission demand scenarios may refer to situations where the predicted need for data transmission surpasses the time currently allocated for the RF signal transmission operations on the first frequency band. The processor 306 may recognize situations where RF signal reception demand surpasses current allocation of the second TDD configuration. The RF signal reception demand situations may refer to conditions where the predicted need for the RF signal reception of the data exceeds the time currently allocated for the RF signal reception operations on the second frequency band. When the RF signal transmission demand scenarios or the RF signal reception demand situations are identified, the processor 306 may adjust the first TDD configuration by modifying the TXOP allocation parameters within the Wi-Fi® 7 EDCA framework. The TXOP allocation parameters may refer to Transmission Opportunity settings that determine how long each wireless communication device can transmit data during each allocated time period. The modification of the TXOP allocation parameters may enable the processor 306 to implement the determined duty cycle modifications in the wireless communication device (e.g., the first wireless communication device 106A).

In accordance with an embodiment, the processor 306 may be configured to increase downlink transmission periods when predicted demand indicates higher data delivery requirements. The downlink transmission periods may refer to time intervals allocated for the RF signal transmission of the data from the wireless communication device (e.g., the first wireless communication device 106A) to connected devices. The processor 306 may extend the transmission duty cycle from standard to higher allocations during peak demand periods. Transmission duty cycle extension may refer to increasing the percentage of time allocated for the transmission operations within each TDD cycle. The processor 306 may coordinate with the first wireless radio transceiver 322A to implement extended Multi-User Multiple-Input Multiple-Output operations (MU-MIMO) transmission windows. Extended MU-MIMO transmission windows may refer to longer time periods allocated for MU-MIMO. The processor 306 may reduce uplink reception periods on the first frequency band to accommodate increased transmission requirements. The processor 306 may also maintain minimum reception allocation to ensure acknowledgment of the RF signal reception from the wireless communication device (e.g., the first wireless communication device 106A). The minimum reception allocation may refer to a smallest amount of time reserved for the RF signal reception operations necessary to receive confirmation signals.

In accordance with an embodiment, the processor 306 may be configured to modify the second TDD configuration by adjusting complementary TXOP parameters for the second frequency band. The complementary TXOP parameters may refer to Transmission Opportunity settings for the second frequency band that work in coordination with the first frequency band to achieve near-full duplex operation. The processor 306 may increase the uplink reception periods when predicted demand indicates higher data collection requirements from different wireless communication devices of the plurality of wireless communication devices 106. The uplink reception periods may refer to time intervals allocated for receiving data from connected devices or network nodes. The higher data collection requirements may refer to increased demand for receiving large amounts of data based on predictions from the trained ANN model 314. The processor 306 may extend the reception duty cycle from standard to enhanced allocations during anticipated high-traffic periods. The reception duty cycle extension may refer to increasing the percentage of time allocated for the reception operations within each TDD cycle. The enhanced allocations may refer to increased time percentages assigned to the reception operations to meet elevated demand. The processor 306 may coordinate with the second wireless radio transceiver 322B to implement extended Multi-User Orthogonal Frequency Division Multiple Access (MU-OFDMA) reception processing windows. Extended MU-OFDMA reception processing windows may refer to longer time periods allocated for MU-OFDMA operations that enable concurrent data reception from the connected devices. The processor 306 may reduce downlink transmission periods on the second frequency band to accommodate increased reception demands. The processor 306 may preserve essential transmission capacity for controlling signaling and acknowledgment responses. The essential transmission capacity may refer to a minimum amount of time reserved for the RF signal transmission operations necessary to send control signals and confirmation messages.

In accordance with an embodiment, the processor 306 may ensure that the first TDD configuration adjustments complement the second TDD configuration modifications to maintain near-full duplex operation in the wireless mesh network 108. The TDD configuration adjustments complement the second TDD configuration means coordinated adjustments where modifications to the first TDD configuration work together with changes to the second TDD configuration to achieve enhanced performance. The processor 306 may synchronize timing adjustments across both frequency bands through Multi-Link Device (MLD) framework coordination. The MLD framework coordination may refer to MLD management that ensures synchronized operation between the first wireless radio transceiver 322A and the second wireless radio transceiver 322B. The processor 306 may maintain frame boundary alignment between modified TDD configurations. The frame boundary alignment may refer to ensuring that the RF signal transmission periods and the RF signal reception periods on both frequency bands start and end at coordinated time intervals to prevent interference. The processor 306 may further adjust the SIFS guard intervals to accommodate allocation of new duty cycles. The SIFS guard intervals may refer to Short Interframe Space periods that provide timing separation between the RF signal transmission and the RF signal reception transitions to prevent signal overlap. The new duty cycle allocation may refer to the updated time distribution settings implemented based on predicted demand requirements. The processor 306 may further coordinate traffic identifier mapping to route appropriate data types to adjusted frequency band allocations. The traffic Identifier mapping may refer to the process of directing specific types of network traffic to designated frequency bands based on the modified TDD configurations.

In an example, the processor 306 may receive predictions that indicate increased downlink demand during morning peak hours. The processor 306 may adjust the first TDD configuration from current allocation to updated downlink/uplink ratio. The processor 306 may concurrently modify the second TDD configuration from a current allocation to updated downlink/uplink ratio. The processor 306 may implement the changes through EDCA parameter updates to the first wireless radio transceiver 322A and the second wireless radio transceiver 322B. The processor 306 may coordinate beam steering the one or more dual-polarized phased array antennas 316 to support modified RF signal transmission pattern and modified RF signal reception pattern.

In accordance with an embodiment, the processor 306 may implement TDD configuration changes during operational cycles without disrupting ongoing communications. The processor 306 may schedule adjustment transitions during natural frame boundaries to minimize interference. The natural frame boundaries may refer to determined time intervals between communication frames where transitions can occur with minimal disruption to data flow. The processor 306 may coordinate adjustment timing with different wireless communication devices through network synchronization protocols. The processor 306 may monitor performance metrics during adjustment implementation to verify effectiveness. The processor 306 may maintain cross-polarization isolation and spatial separation requirements throughout adjustment processes.

In accordance with an embodiment, the processor 306 may validate TDD configuration adjustments by monitoring actual performance against predicted demand requirements. The processor 306 measures throughput improvements on adjusted frequency bands. The processor 306 may track change in latency from modified duty cycle allocations. The processor 306 may determine packet delivery success rates under new TDD configurations. The processor 306 may store adjustment outcomes in the historical data usage patterns 308A for future ANN model training and prediction refinement.

In accordance with an embodiment, the processor 306 may analyze signal quality measurements from communications with target wireless communication devices to assess hopping sequence effectiveness. The processor 306 may detect interference sources and modifies hopping sequence patterns to avoid spatial directions experiencing high interference levels. The processor 306 may adapt sequence timing based on traffic load variations and communication demand changes with different wireless communication devices (e.g., the first wireless communication device 106A). The processor 306 may further implement feedback-based sequence optimization where successful beam patterns receive increased allocation within the hopping sequence while problematic patterns are reduced or eliminated.

In accordance with an embodiment, the processor 306 may be further configured to generate, via the one or more dual-polarized phased array antennas, a plurality of beams of radio frequency (RF) signals in a narrow beam pattern with a beamwidth between 10 degrees to 30 degrees. The narrow beam pattern may refer to a highly focused electromagnetic radiation pattern generated by the one or more dual-polarized phased array antennas 316 with concentrated energy within a defined angular range of 10 degrees to 30 degrees. The narrow beam pattern may generate highly directional communication links between the plurality of wireless communication devices 106 by concentrating radio frequency energy in precise spatial directions. The narrow beam pattern may provide improved range extension as they direct maximum power toward intended recipients. The narrow beam pattern may enable spatial interference mitigation as the narrow beam pattern avoids the RF signal transmission toward unintended directions.

In accordance with an embodiment, the processor 306 may form the narrow beam pattern by application of specific phase shifts to each antenna element of the one or more dual-polarized phased array antennas 316. The processor 306 may determine phase delay in phases based on target beam direction and beamwidth characteristics. The processor 306 may apply progressive phase shifts across antenna elements to steer beam patterns toward defined spatial coordinates. The processor 306 may coordinate amplitude tapering across the antenna elements to control beam shape and sidelobe levels. The processor 306 may implement real-time phase adjustments to maintain beam that points accuracy during communication operations.

For example, the processor 306 may generate the plurality of narrow beams of RF via control of the one or more dual-polarized phased array antennas 316 with specific phase and amplitude. The processor 306 may determine phase delay for the antenna elements that have horizontal polarization to create a 15-degree beamwidth pattern directed toward a target wireless communication device (e.g., the first wireless communication device) at 90 degrees. The processor 306 may apply progressive phase shifts of 0, 45, 90, 135, 180, 225, 270, and 315 degrees across the antenna elements that have horizontal polarization to achieve beam steering toward the target direction. The processor 306 may concurrently determine independent phase delay for the antenna elements that have vertical polarization to generate a complementary narrow beam for reception operations directed toward bearing 120 degrees. The processor 306 may maintain a 30-degree spatial separation between the RF signal transmission beam pattern and the RF signal reception beam pattern to achieve the required isolation. Further, the processor 306 may implement amplitude tapering with weights of 1.0, 0.9, 0.8, 0.7, 0.7, 0.8, 0.9, 1.0 across antenna elements to reduce sidelobe levels and improve beam pattern quality.

In accordance with an embodiment, the processor 306 may be further configured to determine a hopping sequence for the plurality of beams of RF signals in the narrow beam pattern for the control of the communication with the one or more wireless communication devices of the plurality of wireless communication devices 106. The hopping sequence may establish a coordinated pattern for the selection of the beam pattern and channel that may enable enhanced spatial separation and interference mitigation. The hopping sequence may incorporate both spatial diversity through beam direction changes and temporal diversity through time-based switching patterns. The hopping sequence may enable the piecewise narrow beam hopping operation that may further reduce self-interference beyond the first TDD configuration and the second TDD configuration.

In accordance with an embodiment, the hopping sequence may operate by rapid switching between the plurality of narrow beam according to a determined pattern that coordinates beam directions, timing intervals, and polarization selections. The hopping sequence may define specific time periods when beam patterns remain active for communication with the plurality of wireless communication devices (e.g., the first wireless communication device 106A). The hopping sequence may coordinate spatial beam directions such that transmission beams on the first frequency band and the reception beams on the second frequency band maintain the required spatial separation of at least 30 degrees throughout the switching pattern. The hopping sequence may incorporate cross-polarization management where horizontal and vertical polarization beam patterns alternate according to the determined hopping operation. The hopping sequence may enable the processor 306 to generate time-based spatial isolation where different beam patterns operate during non-overlapping time intervals to prevent interference between concurrent communications with the plurality of wireless communication devices 106.

In accordance with an embodiment, the processor 306 may determine the hopping sequence by analyzing network topology mapping, location of the wireless communication devices (e.g., the first wireless communication device 106A) that are targeted, and spatial separation requirements for communication with the one or more different wireless communication devices of the plurality of wireless communication devices 106. The processor 306 may determine beam directions for each target wireless communication device based on the spatial coordinates of each target wireless communication device within the wireless mesh network 108. Further, the processor 306 may determine spatial separation constraints to ensure that concurrent beam patterns maintain minimum angular separation requirements during hopping.

In some embodiments, the processor 306 may generate the hopping sequence via use of pseudo-random sequence operations that may generate unpredictable yet coordinated beam switching patterns for enhanced interference mitigation. The processor 306 may implement pseudo-random number generation techniques to create sequence patterns that appear random to potential interferers. The sequence patterns may maintain coordinated operation within the wireless mesh network 108. The processor 306 may determine hopping sequence intervals based on communication requirements with specific target devices and network traffic patterns. The processor 306 may coordinate the timing of hopping sequence with Short Interframe Space (SIFS) periods to ensure smooth transitions between beam patterns without disrupting ongoing communications. For example, the hopping sequence may operate with time slots of duration of 100 microseconds. The duration of 100 microseconds enables position change of up to 100 beams within each 10-millisecond TDD frame. Each of the beam switching is accomplished through parallel loading of phase shift values into digital phase shifters with settling time less than 1 microsecond. When interference is detected on a specific beam direction through signal-to-interference-plus-noise ratio (SINR) measurements that falls below −10 dB threshold, the processor 306 may modify the hopping sequence. The hopping sequence may be modified by the processor 306 by application of a blacklist filter that excludes the interfered beam positions from the pseudo-random sequence operation. Further, the hopping sequence may be modified by the processor 306 through reduction of the modulo operation range from 360 degrees to exclude the compromised angular sectors. Furthermore, the hopping sequence may be modified by the processor 306 by redistribution of the excluded time slots among the remaining interference-free beam directions.

In accordance with an embodiment, the one or more dual-polarized phased array antennas 316 may be configured to communicate data on orthogonal polarizations based on the first TDD configuration and the second TDD configuration. In some implementations, the one or more dual-polarized phased array antennas 316 may include the antenna elements where each element contains two perpendicular radiating structures that generate orthogonal polarization. The antenna elements of the one or more dual-polarized phased array antennas 316 may generate electromagnetic waves with electric field vectors oriented in two perpendicular planes such as the horizontal polarization and the vertical polarization. The horizontal polarization and the vertical polarization may remain mathematically orthogonal and physically independent. The orthogonal polarizations may enable the one or more dual-polarized phased array antennas 316 to concurrently handle two separate data streams without interference. In some examples, the one or more dual-polarized phased array antennas 316 may maintain cross-polarization isolation of at least 20 dB between the orthogonal polarizations, to ensure that signals that have horizontal polarization remain distinct from signals that have vertical polarization during concurrent operations. Further, during the RF signal transmission, the one or more dual-polarized phased array antennas 316 may convert electrical signals from the first wireless radio transceiver 322A into electromagnetic waves with defined polarization orientations. The one or more dual-polarized phased array antennas 316 may direct the RF signals that have horizontal polarization toward target wireless communication device (e.g., the first wireless communication device 106A) while concurrently prepare vertical polarization paths for potential reception of the RF signals that have vertical polarization. During the RF signal transmission operation, the antenna elements of the one or more dual-polarized phased array antennas 316 may adjust phase and amplitude relationships to generate directional beam patterns through channelization of electromagnetic energy toward the defined spatial directions. During the RF signal reception, the one or more dual-polarized phased array antennas 316 may capture incoming electromagnetic waves and may separate the incoming electromagnetic waves based on orientation of polarization. The RF signals that have horizontally polarization may activate corresponding antenna elements of the one or more dual-polarized phased array antennas 316. Further, the RF signals that have vertically polarization engage corresponding antenna elements of the one or more dual-polarized phased array antennas 316.

In accordance with an embodiment, the first TDD configuration may directly control the coordination of the one or more dual-polarized phased array antennas 316 with the first wireless radio transceiver 322A operating on the first frequency band. During the extended RF signal transmission periods of the first TDD configuration, the one or more dual-polarized phased array antennas 316 may prioritize transmission of the RF signals that have horizontal polarization. The one or more dual-polarized phased array antennas 316 may dedicate majority of the operational cycles to beam steering and power amplification for downlink data delivery. The one or more dual-polarized phased array antennas 316 may generate the plurality of narrow beam patterns using electronic phase shifting across the antenna elements and may create highly directional transmission paths that minimize interference and maximize signal strength toward target slave nodes. When the first TDD configuration transitions to the RF signal reception periods, the one or more dual polarized phased array antennas 316 may switch the antenna elements corresponding to the horizontal polarization to the reception mode while maintaining spatial separation between the RF signal transmission beam direction and the RF signal reception beam direction.

In accordance with an embodiment, the one or more dual polarized phased array antennas 316 may coordinate beam directions such that the RF signal transmission beams on the first frequency band and RF signal reception beams on the second frequency band maintain spatial separation of a defined degree. The maintenance of spatial separation may facilitate prevention of the self-interference during the transition periods managed by the SIFS guard intervals. The second TDD configuration may concurrently control coordination of the one or more dual-polarized phased array antennas 316 with the second wireless radio transceiver 322B. The second wireless radio transceiver 322B may operate on the second frequency band through the orthogonal vertical polarization path. During the extended reception periods, the second TDD configuration may prioritize reception of the RF signals that have vertical polarization. The one or more dual-polarized phased array antennas 316 may dedicate the majority of operational cycles to sensitive signal detection and enhanced spatial filtering for uplink data collection. The one or more dual-polarized phased array antennas 316 may implement enhanced Low-Noise Amplifier (LNA) with the antenna elements corresponding to vertical polarization. The implementation of the LNA may enhance the sensitivity of receivers of the one or more dual-polarized phased array antennas 316 to detect weak incoming signals from the wireless communication device (e.g., the first wireless communication device 106A). When the second TDD configuration transitions to the RF signal transmission periods, the antenna elements corresponding to the vertical polarization may switch to the transmission mode. Concurrently, the antenna elements corresponding to the vertical polarization may maintain coordinated null steering to prevent interference with the concurrent operation of the horizontal polarization. The one or more dual-polarized phased array antennas 316 may ensure that the reception beams corresponding to the vertical polarization and the RF signal transmission beams corresponding to the horizontal polarization may maintain the required spatial separation and cross-polarization isolation throughout the coordinated TDD cycles.

In an example, for a 10-millisecond operational cycle where the one or more dual-polarized phased array antennas 316 may manage the first TDD configuration and the second TDD configuration concurrently. During the first 9 milliseconds, the antenna elements corresponding to the horizontal polarization may transmit high-power downlink RF signals on the first frequency band while the antenna elements corresponding to the vertical polarization may concurrently receive sensitive uplink signals on the second frequency band and may achieve near-concurrent bidirectional communication. The one or more dual-polarized phased array antennas 316 may maintain 20 dB cross-polarization isolation to ensure that the horizontal transmission energy may not interfere with the vertical reception sensitivity. During the final 1 millisecond, the one or more dual-polarized phased array antennas 316 may transition both the horizontal polarization and the vertical polarization. The antenna elements corresponding to the horizontal polarization may switch to the reception mode for the first frequency band while the antenna elements corresponding to the vertical polarization may switch to a transmission mode for the second frequency band.

In accordance with an embodiment, the processor 306 may be further configured to concurrently control communication with one or more wireless communication devices on the first frequency band and the second frequency band based on the first TDD configuration and the second TDD configuration. Concurrent control based on TDD configurations may refer to concurrent management of communication operations where timing and resource allocation are determined by the asymmetric TDD settings of both frequency bands. The processor 306 may use the first TDD configuration to control transmission-focused communication on the first frequency band. The processor 306 may concurrently use the second TDD configuration to control reception-focused communication on the second frequency band. For example, the processor 306 may implement a 10-millisecond operational cycle based on coordinated TDD configuration timing. The first TDD configuration may allocate 9 milliseconds for the RF signal transmission operations and 1 millisecond for the RF signal reception operations on the first frequency band. The second TDD configuration may allocate 9 milliseconds for the RF signal reception operations and 1 millisecond for the RF signal transmission operations on the second frequency band. The processor 306 may control concurrent communication by coordinating the complementary timing allocations of both TDD configurations within the 10-millisecond operational cycle.

In accordance with an embodiment, during the first 9 milliseconds, the processor 306 may control the RF signal transmission operations on the first frequency band according to the first TDD configuration timing allocation. The processor 306 may direct the first wireless radio transceiver 322A to transmit downlink data streams to the one or more wireless communication devices in the wireless mesh network 108 based on the transmission-heavy allocation of the first TDD configuration. Concurrently, the processor 306 may control the RF signal reception operations on the second frequency band according to the second TDD configuration timing allocation. The processor 306 may coordinate the second wireless radio transceiver 322B to receive uplink data streams from the one or more wireless communication devices in the wireless mesh network 108 based on the reception-heavy allocation of the second TDD configuration.

In accordance with an embodiment, during the final 1-millisecond period, the processor 306 may control transition operations based on the complementary TDD configuration timing. The first TDD configuration may allocate the final 1 millisecond for reception operations on the first frequency band. The second TDD configuration may allocate the final 1 millisecond for the RF signal transmission operations on the second frequency band. The processor 306 may coordinate both wireless radio transceivers to switch operational modes according to the TDD configuration requirements. The concurrent control based on coordinated TDD configurations enables the wireless communication device to achieve near-full duplex communication efficiency through asymmetric time allocation across both frequency bands.

In accordance with an embodiment, the processor 306 may be further configured to concurrently control communication with the one or more wireless communication devices on the first frequency band and the second frequency band based on the communication of the data on the orthogonal polarizations. The processor 306 may manage the RF signal transmission and the RF signal reception of the data on the orthogonal polarizations by coordinating the one or more dual-polarized phased array antennas 316 to maintain independent horizontal and vertical polarization paths for the concurrent RF signal transmission and reception operations. Independent polarization paths may refer to separate signal channels where horizontal polarization handles data transmission while vertical polarization handles data reception without interference between the channels.

In accordance with an embodiment, the processor 306 may coordinate the data transmission on orthogonal polarizations by directing the first wireless radio transceiver 322A to generate electrical signals that convert to electromagnetic waves with specific horizontal polarization orientation through the one or more dual-polarized phased array antennas 316. The horizontal polarization orientation may refer to electromagnetic wave configuration where electric field vectors oscillate in horizontal planes perpendicular to the direction of wave propagation. The processor 306 may control the phase and amplitude relationships across the array elements of the one or more dual-polarized phased array antennas 316 to generate directional beam patterns with horizontal electric field vectors. Directional beam patterns with horizontal electric field vectors may refer to focused RF signal transmissions where electromagnetic energy propagates in specific directions while maintaining consistent horizontal polarization characteristics. The generation of the directional beam patterns with horizontal electric field vectors may ensure that the RF signal transmission of the data streams maintain consistent polarization characteristics throughout the beam formation process. Concurrently, the processor 306 may manage the RF signal reception of the data on the orthogonal vertical polarization by coordinating the second wireless radio transceiver 322B to capture incoming electromagnetic waves with vertical electric field orientations through the one or more dual-polarized phased array antennas 316. Vertical electric field orientations may refer to electromagnetic wave configuration where electric field vectors oscillate in vertical planes perpendicular to the direction of wave propagation. The processor 306 may perform polarization-selective signal processing where horizontally polarized signals activate antenna elements configured for horizontal polarization. The polarization-selective signal processing may refer to the ability to distinguish and process signals based on the polarization orientation of incoming electromagnetic waves. The signals with vertical polarization may engage with separate antenna elements configured for vertical polarization within the same dual-polarized phased array antenna structure. The polarization-selective signal processing enables concurrent bidirectional data operations without polarization crosstalk between the horizontal and vertical polarization channels.

In accordance with an embodiment, the processor 306 may achieve concurrent control by coordinating data communication timing across both orthogonal polarizations simultaneously. When the RF signal transmission of the data occurs through horizontal polarization on the first frequency band, the RF signal reception of the data may occur concurrently through vertical polarization on the second frequency band. The orthogonal polarization-based concurrent control enables the wireless communication device to maintain continuous data flow in both directions while avoiding the time-based switching delays associated with conventional half-duplex systems. The concurrent control based on orthogonal polarization communication allows the wireless communication device to achieve near-full duplex communication efficiency through spatial diversity and signal separation.

In accordance with an embodiment, the processor 306 may manage data communication with a slave node of the wireless communication device (e.g., the second wireless communication device 106B) via use of orthogonal polarizations across both frequency bands concurrently. The processor 306 may initiate horizontal polarization transmission on the first frequency band by coordinating the first wireless radio transceiver 322A to generate MU-MIMO data streams with horizontal electric field orientation through the one or more dual-polarized phased array antennas 316. The processor 306 may control the phases of the antenna element to generate the narrow beam pattern with horizontal polarization directed toward the slave node of the wireless communication device (e.g., the second wireless communication device 106B) at bearing 90 degrees, in an example.

In accordance with an embodiment, the processor 306 may extend communication control across the wireless mesh network 108 through coordination of the first TDD configuration and the second TDD configuration with the plurality of wireless communication devices 106 through network-wide synchronization. The processor 306 may propagate timing synchronization information throughout the wireless mesh network 108 to ensure that the wireless communication device (e.g., the first wireless communication device 106A) may maintain the coordinated first TDD configuration and the second TDD configuration that complement the asymmetric patterns. When the processor 306 may detect network anomalies or performance degradation in communication with the plurality of wireless communication devices 106. Further, the processor 306 may execute self-healing actions through dynamic adjustment of hopping sequences. Furthermore, the processor 306 may execute self-healing actions modification of beam steering parameters, or reconfiguring TDD duty cycle allocations to restore communication performance.

In accordance with an embodiment, the processor 306 may be further configured to detect an interference on the first frequency band or the second frequency band. The processor 306 may detect interference on the first frequency band and the second frequency band through continuous or periodic monitoring of signal quality measurements and network performance metrics during communication operations with different wireless communication devices. The processor 306 may analyze signal-to-noise ratio variations, packet delivery success rates, and signal strength measurements to identify degradation patterns that indicate interference presence on either frequency band.

In accordance with an embodiment, the processor 306 may monitor cross-polarization isolation effectiveness to detect interference affecting the orthogonal polarization operations of the one or more dual-polarized phased array antennas 316. The processor 306 may implement real-time analysis of beam steering performance metrics to identify spatial directions experiencing elevated interference levels that may compromise communication quality with target wireless communication devices (e.g., the first wireless communication device 106A). The processor 306 may detect interference by comparing current performance measurements against baseline performance thresholds established during normal network operations, identifying deviations that exceed determined tolerance levels. The processor 306 may coordinate interference detection across both frequency bands concurrently to assess whether interference affects operations of the first TDD configuration, the second TDD configuration, or both operational modes concurrently.

In accordance with an embodiment, the processor 306 may be further configured to dynamically adjust the determined hopping sequence based on the detected interference on the first frequency band or the second frequency band. The processor 306 may dynamically adjust the determined hopping sequence by continuously monitoring interference levels detected on the first frequency band and the second frequency band through signal quality measurements collected by the first wireless radio transceiver 322A and the second wireless radio transceiver 322B. The processor 306 may analyze the detected interference by comparing received signal strength indicator (RSSI) values, signal-to-noise ratio (SNR) measurements, and packet error rate statistics against determined threshold levels. The comparison may facilitate identification of specific beam directions and frequency ranges experiencing degraded communication performance due to interference sources. The processor 306 may be configured to determine beam direction modifications by executing interference mitigation operations that identify alternative beam patterns from the plurality of beams of RF signals that avoid the detected interference zones. The processor 306 may be configured to modify the determined hopping sequence by updating the stored beam pattern sequence in the memory 308 to substitute interference-affected beam directions with alternative beam directions that provide improved signal quality. The processor 306 may be configured to modify the determined hopping sequence adjusting the timing intervals between beam switches to reduce exposure to detected interference periods. Further, the processor 306 may be configured to modify the determined hopping sequence by reordering the beam selection pattern to prioritize beam directions that demonstrate enhanced communication performance.

In accordance with an embodiment, the processor 306 may be configured to validate the adjusted hopping sequence by implementing the modified beam switching pattern through updated control signals transmitted to the phase shifter circuits and variable gain amplifier circuits of the one or more dual-polarized phased array antennas 316. Further, the processor 306 may be configured to validate the adjusted hopping sequence by monitoring the resulting communication performance improvements through reduced packet loss rates and enhanced signal quality metrics. Further, the processor 306 may be configured to validate the adjusted hopping sequence by storing the validated sequence modifications for continued use until subsequent interference conditions require further dynamic adjustments. The processor 306 may be configured to maintain continuous adaptation by repeating the interference detection and sequence adjustment process throughout the communication session. The continuous adaptation ensures that the determined hopping sequence remains enhanced for current RF environment conditions on both the first frequency band and the second frequency band to maximize communication reliability with the plurality of wireless communication devices 106.

In accordance with an embodiment, the processor 306 may be further configured to switch between the plurality of beams of RF signals for the control of the communication with the one or more wireless communication devices of the plurality of wireless communication devices 106. The switch between the plurality of beams of RF signals is based on the determined hopping sequence. The processor 306 may follow the timing of determined hopping sequence to control when each beam pattern becomes active. The processor 306 then may determine new phase delay values for each antenna element when switch to a different beam direction. Further, the processor 306 may apply updated amplitude weights to reshape beam patterns during switch operations and coordinates switch timing with SIFS periods to prevent interference during transitions.

In accordance with an embodiment, the processor 306 may activate different beam patterns according to the determined hopping sequence schedule for communication with target wireless communication devices (e.g., the first wireless communication device 106A). For example, the processor 306 switches from a first beam pattern directed toward the first wireless communication device 106A to a second beam pattern directed toward the second wireless communication device 106B. The processor 306 may coordinate switch timing to allocate appropriate communication time slots for each target wireless communication device (e.g., the first wireless communication device 106A). The processor 306 ensures that beam switching intervals match the communication requirements and traffic demands of different target devices (e.g., the first wireless communication device 106A). The processor 306 may maintain spatial separation requirements during beam switching by verifying angular distances between consecutive beam patterns. The processor 306 coordinates beam switching with both horizontal and vertical polarization elements to support concurrent dual-band operations.

In an example, the processor 306 may implement beam switching for communication with the first wireless communication device 106A, the second wireless communication device 106B and the Nth wireless communication device 106N at different spatial positions within the wireless mesh network 108. The processor 306 may start with the first beam pattern directed toward the first wireless communication device 106A at 45 degrees for 100 microseconds. The processor 306 may switch to the second beam directed toward the second wireless communication device 106B at bearing 120 degrees for 150 microseconds. The processor 306 may transition to a third beam pattern directed toward the nth wireless communication device 106N at 270 degrees for 200 microseconds. The processor 306 completes the hopping sequence cycle and returns to the first beam pattern to repeat the switching pattern. The processor 306 may maintain 30 degrees spatial separation between the RF signal transmission and reception beam patterns throughout the switching sequence.

In accordance with an embodiment, the processor 306 may be further configured to switch between the plurality of beams of RF signals at a higher switching frequency at the transmission periods of the first TDD configuration than at the transmission periods of the second TDD configuration. In RF signal transmission windows, the processor 306 may rapidly cycle through different beam directions in accordance with the determined hopping sequence. Each beam corresponds to a unique spatial direction targeting different nodes or zones within the network. By switching beams at a high rate, the processor 306 may generate virtual micro timeslots that may enable effective beam division multiplexing i.e., to send data to multiple nodes in a sequential yet tightly time-packed manner. On the contrary, during the RF signal transmission periods of the second TDD configuration, which has shorter durations of the RF signal transmission (e.g., only 10% downlink on the 5 GHz band), the processor 306 may switch beams at a lower frequency. Since the time allocated for the RF signal transmission is limited in the configuration, rapid beam switching may not yield substantial benefits and may increase overhead. Therefore, the processor 306 prioritizes stability and efficient use of limited time by either sticking to a single beam for the short RF signal transmission slot or switching only once or twice in that interval. The selective switching conserves processing resources and ensures that the limited downlink duration is utilized effectively without unnecessary transition delays.

In accordance with an embodiment, the processor 306 may be further configured to switch between the plurality of beams of RF signals at a higher switching frequency at reception periods of the second TDD configuration than at the reception periods of the first TDD configuration. During the reception periods, the second TDD configuration may allocate approximately 90% of the operational cycle for uplink communication. The processor 306 may further increase the beam switching frequency to rapid transition between the multiple narrow beam patterns directed toward different source wireless communication devices (e.g., the first wireless communication device 106A) within shorter time intervals. Signal detection is enhanced by switching beam patterns more frequently during the reception-heavy periods. The detection may enable wireless communication device (e.g., the first wireless communication device 106A) to sample multiple spatial directions and capture signals from various nodes more effectively. The higher switching frequency may allow the processor 306 to maximize the utilization of the reception-optimized duty cycle allocation and maintain spatial separation requirements and cross-polarization isolation during the extended uplink periods.

In accordance with an embodiment, the processor 306 may achieve higher switching frequency during the data reception periods in the second TDD configuration (as compared to data transmission periods) by implementation of rapid phase and amplitude adjustments across the antenna elements corresponding to the vertical polarization. The processor 306 may determine accelerated beam steering sequences that enable faster reception beam pattern changes while maintaining enhanced LNA settings and Automatic Gain Control (AGC) operations for sensitive signal detection. The processor 306 may coordinate the accelerated switching with MU-OFDMA reception processing on the second frequency band, which may enable rapid spatial sampling across multiple source devices through frequent beam pattern transitions.

In accordance with an embodiment, during brief reception periods of the first TDD configuration, the processor 306 may reduce beam switching frequency. The reduction in beam switching may be performed as limited reception time allocation requires longer beam pattern stability to ensure complete signal capture and processing from source wireless communication devices. The processor 306 may enhance switching frequency based on asymmetric duty cycle characteristics where reception-heavy periods benefit from rapid beam transitions to maximize spatial diversity for signal collection. Reception-light periods require more stable beam patterns to ensure successful signal detection within constrained time allocation. The processor 306 may coordinate the differential switching approach to complement the RF signal transmission operations occurring concurrently on the first frequency band.

In accordance with an embodiment, the processor 306 may leverage higher switching frequency during the second TDD reception periods to create enhanced spatial sampling that improves signal collection reliability and interference mitigation from multiple source devices across the wireless mesh network 108. The accelerated beam switching may enable the processor 306 to rapidly scan different spatial directions for incoming signals from various wireless communication devices. Spatial scanning may facilitate identification of reception paths and avoiding interference sources more effectively than slower switching patterns. The processor 306 may implement piecewise narrow beam hopping at increased switching rates during reception periods, creating finer spatial granularity in signal collection that enhances overall sensitivity and coverage capabilities of the wireless communication device.

In accordance with an embodiment, the processor 306 enables RF signal transmission on the first frequency band and the RF signal reception on the second frequency band concurrently through coordinated dual-band operation. The processor 306 may cause the first wireless radio transceiver 322A to transmit data on the first frequency band while concurrently coordinating the second wireless radio transceiver 322B to receive data on the second frequency band. The processor 306 may implement MLO framework to establish independent MAC and PHY layers for each frequency band. The processor 306 may maintain separate signal processing paths for the RF signal transmission and reception operations. The processor 306 may coordinate Traffic Identifier (TID)-to-link mapping to route transmission data to the first frequency band and the RF signal reception of the data from the second frequency band. The processor 306 may ensure that concurrent RF signal transmission and reception operations remain synchronized through MLD framework coordination.

In accordance with an embodiment, the processor 306 may be further configured to concurrently transmit a first set of RF signals on the first frequency band and receive a second set of RF signals on the second frequency band to reduce self-interference at the wireless communication device. The processor 306 may reduce self-interference at the first wireless communication device 106A by utilizing different frequency bands for the RF signal transmission and the RF signal reception operations instead of attempting the RF signal transmission and the RF signal reception concurrently on the same frequency. The processor 306 may eliminate the primary source of self-interference where own transmission signal of the first wireless communication device 106A overwhelms receiver circuits when operating on identical frequencies. The processor 306 may maintain frequency isolation between the RF signal transmission operation and the RF signal reception operation through independent radio transceivers. The processor 306 may prevent signal leakage between frequency bands through hardware filtering and isolation techniques. The processor 306 may achieve near-full duplex operation without requiring complex self-interference cancellation circuits needed in true full-duplex systems.

In accordance with an embodiment, the processor 306 may reduce self-interference at the first wireless communication device 106A through orthogonal polarization on the one or more dual-polarized phased array antennas 316. The processor 306 may assign horizontal polarization elements to handle the RF signal transmission operations on the first frequency band while vertical polarization elements manage the RF signal reception operations on the second frequency band. The processor 306 may ensure that the RF signal transmission beams on the first frequency band and the RF signal reception beams on the second frequency band maintain spatial separation of at least 30 degrees. The processor 306 may coordinate polarization-specific operations to enhance isolation between the concurrent RF signal communication.

In an example, the processor 306 may be configured to perform concurrent RF signal communication, such as RF signal transmission as well as RF signal reception, during a 10-millisecond operational cycle with a target wireless communication device in the wireless mesh network 108. The processor 306 may coordinate the first wireless radio transceiver 322A to transmit MU-MIMO data streams on the 6 GHz frequency band using horizontal polarization for 9 milliseconds. The processor 306 may concurrently coordinate the second wireless radio transceiver 322B to receive MU-OFDMA data streams on the 5 GHz frequency band using vertical polarization for the same 9 milliseconds. The processor 306 may maintain 20 dB cross-polarization isolation between horizontal RF signal transmission and vertical RF signal reception operations. The processor 306 may ensure spatial beam separation where transmission beam points toward bearing 90 degrees while reception beam targets bearing 120 degrees. The processor 306 may achieve 30-degree spatial separation to further reduce potential interference between concurrent operations.

In accordance with an embodiment, the processor 306 may coordinate multiple interference reduction operations to achieve effective self-interference mitigation during the concurrent RF signal transmission operation and the RF signal reception operation. The processor 306 may combine frequency separation, polarization diversity, spatial separation, and temporal coordination to minimize interference between concurrent operations. The processor 306 may implement enhanced filtering at the first wireless radio transceiver 322A and the second wireless radio transceiver 322B to prevent signal leakage between frequency bands. The processor 306 may coordinate beam steering to maximize spatial isolation between the RF signal transmission and reception patterns. The processor 306 may maintain synchronized timing through MLD framework operations to prevent operational conflicts between concurrent transceivers. The processor 306 may achieve near-full duplex communication efficiency of 80-90% through coordinated interference reduction mechanisms. The processor 306 may enable the wireless communication device to approach full-duplex performance while operating within standard Wi-Fi® 7 protocol compliance rather than requiring specialized full-duplex radio modifications.

Figure 4:
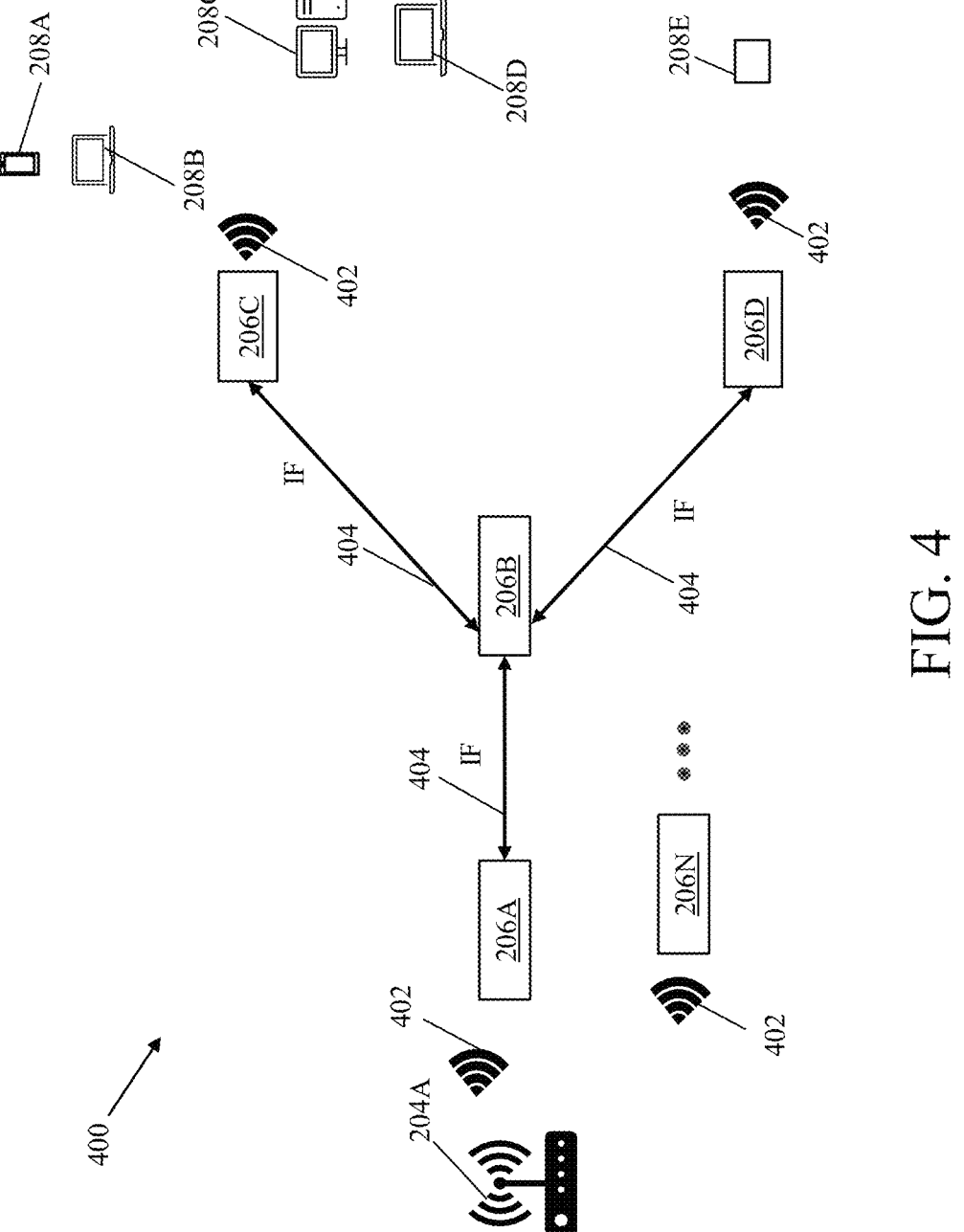
FIG. 4 is a diagram that illustrates an exemplary scenario for implementation of a wireless communication system for operating a plurality of wireless communication devices in a near-full duplex wireless mesh network, in accordance with an exemplary embodiment of the disclosure.

FIG. 4 is a diagram that illustrates an exemplary implementation scenario of a wireless communication system for operating the plurality of wireless communication devices in a near-full duplex wireless mesh network, in accordance with an exemplary embodiment of the disclosure. FIG. 4 is explained in conjunction with elements from FIGS. 1, 2, and 3. With reference to FIG. 4, there is shown an exemplary scenario 400 that illustrates certain operations between the MAP device 204A and the plurality of slave AP devices 206.

The exemplary scenario 400 illustrates an operational flow of the near-full duplex (NFD) mesh network, such as the wireless mesh network 108 including the MAP device 204A and the plurality of slave AP devices 206 arranged in a hierarchical chain topology for wireless data transmission.

In operation, the MAP device 204A may serve as the primary network coordinator of the wireless mesh network (e.g., the wireless mesh network 108). The MAP device 204A may transmit RF signals 402 (i.e., WLAN signal and may also be referred to as Wi-Fi® signals) to the first slave AP device 206A. A first wireless radio transceiver of the MAP device 204A may operate on a first defined frequency (for example, 6 GHz frequency) band with 90% downlink transmission time and 10% uplink reception time. A second wireless radio transceiver of the MAP device 204A may operate on a second defined frequency (for example, 5 GHz) band with 10% downlink transmission time and 90% uplink reception time. The first slave AP device 206A may receive the RF signals 402 from the MAP device 204A. The one or more dual-polarized phased array antennas 316 of the first slave AP device 206A may maintain cross-polarization isolation of a defined value (for example, at least 20 dB) between orthogonal polarizations. The first slave AP device 206A may convert the RF signals 402 to intermediate frequency (IF) signals 404 for network distribution. The first slave AP device 206A may distribute the IF signals 404 to the second slave AP device 206B and the third slave AP device 206C. The first slave AP device 206A may execute the trained ANN model 202B to predict transmission and reception demand. The TDD configurations are adjusted in dynamic manner based on the historical data usage patterns 308A. The beam steering parameters are adjusted for maximum signal strength and minimum interference. The piecewise narrow beam hopping operation may generate multiple beams with beamwidth between 10 to 30 degrees. The wireless communication system 100 may rapidly switch between the beam patterns according to determined hopping sequences. The hopping sequences are dynamically adjusted based on detected interference levels and network conditions.

The second slave AP device 206B and the third slave AP device 206C may receive IF signals 404 from the first slave AP device 206A. The second slave AP device 206B may operate as a switching node that distributes the IF signals 404 to multiple downstream paths. Each of the plurality of slave AP devices 206 may coordinate beam steering operations for a defined signal distribution. The beam steering maintains spatial separation of at least 30 degrees between the RF signal transmission and reception beams. The spatial separation may minimize self-interference between concurrent operations on different frequency bands. The spectrum management facilitated by the orthogonal polarization may maximize spatial reuse efficiency throughout the wireless mesh network 108. Further, the fourth slave AP device 206D may operate as intermediate node receiving and distributing the IF signals 404. The plurality of slave AP devices 206 may incorporate RF switching circuits for signal distribution. The plurality of slave AP devices 206 may utilize the one or more dual-polarized phased array antennas 316 for directional communication. The one or more dual-polarized phased array antennas 316 may enable concurrent routing of parallel RF beams to multiple downstream nodes in different spatial directions.

Further, the second slave AP device 206B, the third slave AP device 206C, the fourth slave AP device 206D, and the Nth slave AP device 206N may convert the IF signals 404 back to the RF signals 402 in a defined frequency for serving one or more UE 208 in the respective coverage areas. In a case where the IF frequency is not WLAN signals like 2.4, 5, 6, or 7 GHz, then the conversion to the defined frequency, such as 5 GHz, or 6 GHz may occur. Alternatively, the defined frequency may be a licensed frequency of a carrier network or an unlicensed frequency depending on the frequency on which the one or more UE 208 are to be served. Each slave AP device of the plurality of slave AP devices 206 may provide WLAN connectivity through the standard Wi-Fi® interfaces that maintain compatibility with conventional wireless devices while delivering enhanced performance characteristics achieved through the near-full duplex network, such as the wireless mesh network 108. The one or more UE 208 may establish wireless connections to the respective serving slave AP devices through standard IEEE 802.11 communication protocols. The one or more UE 208 (e.g., UEs 208A, 208B, 208C, 208D, and 208E) may initiate association procedures using conventional Wi-Fi® authentication operations without requiring specialized protocols or modifications to their existing wireless communication capabilities. The one or more UE 208 may benefit from the enhanced network performance delivered through the coordinated asymmetric TDD configurations operated across dual frequency bands. The wireless mesh network 108 of the MAP device 204A and the plurality of slave AP devices 206 may provide multi-gigabit data transmission and data reception (near full duplex) with significantly reduced latency compared to conventional half-duplex Wi-Fi® mesh networks.

The near full duplex wireless mesh network (e.g., the wireless mesh network 108) may operate through analog RF bridging of the IF signals 404 between the plurality of slave AP devices 206 without requiring digital decoding or encoding of user data at intermediate nodes. The analog bridging architecture may eliminate processing delays and maintains ultra-low latency signal propagation throughout the wireless mesh network 108. The network topology of the near full duplex wireless mesh network may enable dynamic switching between different signal paths when RF signal interference or blockage is detected on specific communication routes.

FIGS. 5A and 5B are diagrams that collectively illustrate a flowchart of a method for operating the exemplary wireless communication device in a near-full duplex wireless mesh network, in accordance with an embodiment of the disclosure. FIGS. 5A and 5B are explained in conjunction with elements from FIGS. 1, 2, 3, and 4. With reference to 5A and 5B, there is shown a flowchart of a method 500 that includes exemplary operations 502 through 522. The method 500 may be implemented in the wireless communication system 100 with the wireless communication device (e.g., the first wireless communication device) of the plurality of wireless communication devices 106.

At 502, the first wireless radio transceiver 322A may be operated on the first frequency band with the first TDD configuration that allocates more time for the RF signal transmission than the RF signal reception.

At 504, the second wireless radio transceiver 322B may be operated on the second frequency band with the second TDD configuration that allocates more time for the RF signal reception than the RF signal transmission.

At 506, the trained ANN model 314 may be executed to predict the local data transmission and reception demand based on the historical data usage patterns 308A at the wireless communication device (e.g., the first wireless communication device 106A).

At 508, the first TDD configuration and the second TDD configuration may be adjusted based on the local data transmission and reception demand.

At 510, the plurality of beams of radio frequency (RF) signals may be generated in the narrow beam pattern with beamwidth between 10 degrees to 30 degrees.

At 512, the hopping sequence for plurality of beams of RF signals may be determined in the narrow beam pattern to control communication with the one or more different wireless communication devices of the plurality of wireless communication devices 106.

At 514, the data may be communicated by the wireless communication device (e.g., the first wireless communication device 106A) based on the first TDD configuration and the second TDD configuration.

At 516, the communication with the one or more wireless communication devices (e.g., the plurality of wireless communication devices 106) on the first frequency band and the second frequency band may be concurrently controlled. In some embodiments, the communication is controlled based on the first TDD configuration and the second TDD configuration. In some embodiments, the communication is controlled based on the communication of the data on the orthogonal polarizations.

At 518, the plurality of beams of RF signals may be switched based on the determination of the hopping sequence for the control of communication with the one or more different wireless communication devices of the plurality of wireless communication devices 106.

At 520, the plurality of beams of RF signals may be switched at a higher switching frequency during the transmission periods of the first TDD configuration than during the transmission periods of the second TDD configuration.

At 522, the plurality of beams of RF signals may be switched at a higher switching frequency during the reception periods of the second TDD configuration than during the reception periods of the first TDD configuration.

Various embodiments of the disclosure may provide the wireless communication device (e.g., the first wireless communication device 106A). The wireless communication device (e.g., the first wireless communication device 106A) may include the first wireless radio transceiver 322A that may be configured to operate on the first frequency band with the first TDD configuration that allocates more time for the RF signal transmission than the RF signal reception. The wireless communication device (e.g., the first wireless communication device 106A) may further include the second wireless radio transceiver 322B that may be configured to operate on the second frequency band with the second TDD configuration that allocates more time for the RF signal reception than the RF signal transmission. The wireless communication device (e.g., the first wireless communication device 106A) may further include the one or more dual-polarized phased array antennas 316 configured to communicate data on the orthogonal polarizations based on the first TDD configuration and the second TDD configuration. The wireless communication device (e.g., the first wireless communication device 106A) may further include the processor 306 that may be configured to concurrently control communication with the one or more wireless communication devices of the plurality of wireless communication devices 106 on the first frequency band and the second frequency band based on the first TDD configuration and the second TDD configuration. The processor 306 may be configured to concurrently control communication with the one or more wireless communication devices of the plurality of wireless communication devices 106 on the first frequency band and the second frequency band based on the communication of the data on the orthogonal polarizations.

Various embodiments of the disclosure may provide a computer program product for wireless communication, the computer program product including a computer-readable storage medium (e.g., a non-transitory computer-readable storage medium) having program instructions embodied therewith, the program instructions are executable by a system to cause the system to execute operations, the operations may include operating the wireless communication device (e.g., the first wireless communication device 106A) on the first frequency band with the first TDD configuration that allocates more time for the RF signal transmission than the RF signal reception. The operations may further include operating the wireless communication device (e.g., the first wireless communication device 106A) based on the second frequency band with the second TDD configuration that allocates more time for the RF signal reception than the RF signal transmission. The operation may further include communicating the data on the orthogonal polarizations based on the first TDD configuration and the second TDD configuration. The operations may further include concurrently controlling communication of the wireless communication device (e.g., the first wireless communication device 106A) with the one or more wireless communication devices on the first frequency band and the second frequency band based on the first TDD configuration and the second TDD configuration, and the communication of the data on the orthogonal polarizations.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, the software can be implemented using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but such data movement does not render the storage device as transitory because the data is not transitory while it is stored.

What is claimed is:
1. A wireless communication device, comprising:
a first wireless radio transceiver configured to operate on
a first frequency band with a first time-division duplex- ing configuration that allocates more time for radio frequency (RF) signal transmission than RF signal reception;

a second wireless radio transceiver configured to operate on a second frequency band with a second time-division duplexing configuration that allocates more time for the RF signal reception than the RF signal transmission;

one or more dual-polarized phased array antennas configured to communicate data on orthogonal polarizations based on the first time-division duplexing configuration and the second time-division duplexing configuration; and a processor configured to concurrently control communication with one or more wireless communication devices of a plurality of wireless communication devices on the first frequency band and the second frequency band based on:

the first time-division duplexing configuration and the second time-division duplexing configuration, and the communication of the data on the orthogonal polarizations.

2. The wireless communication device of claim 1, wherein the processor is further configured to execute a trained artificial neural network model on historical data usage patterns at the wireless communication device to predict a local data transmission demand and a local data reception demand.

3. The wireless communication device of claim 2, wherein the processor is further configured to adjust the first time-division duplexing configuration and the second time-division duplexing configuration based on the local data transmission demand and the local data reception demand.

4. The wireless communication device of claim 1, wherein the processor is further configured to generate, via the one or more dual-polarized phased array antennas, a plurality of beams of RF signals in a narrow beam pattern with a beamwidth between 10 degrees to 30 degrees.

5. The wireless communication device of claim 4, wherein the processor is further configured to determine a hopping sequence for the plurality of beams of RF signals in the narrow beam pattern for the control of the communication with the one or more wireless communication devices of the plurality of wireless communication devices.

6. The wireless communication device of claim 5, wherein the processor is further configured to switch between the plurality of beams of RF signals for the control of the communication with the one or more wireless communication devices of the plurality of wireless communication devices, and wherein the switch between the plurality of beams of RF signals is based on the determined hopping sequence.

7. The wireless communication device of claim 5, wherein the processor is further configured to switch between the plurality of beams of RF signals at a higher switching frequency at transmission periods of the first time-division duplexing configuration than at transmission periods of the second time-division duplexing configuration.

8. The wireless communication device of claim 5, wherein the processor is further configured to switch between the plurality of beams of RF signals at a higher switching frequency at reception periods of the second time-division duplexing configuration than at reception periods of the first time-division duplexing configuration.

9. The wireless communication device of claim 5, wherein the processor is further configured to:

detect an interference on the first frequency band or the second frequency band; and dynamically adjust the determined hopping sequence based on the detected interference on the first frequency band or the second frequency band.

10. The wireless communication device of claim 1, wherein the processor is further configured to concurrently transmit a first set of RF signals on the first frequency band and receive a second set of RF signals on the second frequency band to reduce self-interference at the wireless communication device.

11. The wireless communication device of claim 1, wherein the wireless communication device is a part of a wireless mesh network that comprises the plurality of wireless communication devices.

12. A method of wireless communication, the method comprising:

in a wireless communication device that includes a first wireless radio transceiver and a second wireless radio transceiver:

operating the first wireless radio transceiver on a first frequency band with a first time-division duplexing configuration that allocates more time for radio frequency (RF) signal transmission than RF signal reception;

operating the second wireless radio transceiver on a second frequency band with a second time-division duplexing configuration that allocates more time for the RF signal reception than the RF signal transmission;

communicating data on orthogonal polarizations based on the first time-division duplexing configuration and the second time-division duplexing configuration; and concurrently controlling communication with one or more wireless communication devices of a plurality of wireless communication devices on the first frequency band and the second frequency band based on:

the first time-division duplexing configuration and the second time-division duplexing configuration, and the communication of the data on the orthogonal polarizations.

13. The method of claim 12, further comprising executing a trained artificial neural network model on historical data usage patterns at the wireless communication device to predict a local data transmission demand and a local data reception demand.

14. The method of claim 13, further comprising adjusting the first time-division duplexing configuration and the second time-division duplexing configuration based on the local data transmission demand and the local data reception demand.

15. The method of claim 13, further comprising generating a plurality of beams of radio frequency (RF) signals in a narrow beam pattern with beamwidth between 10 degrees to 30 degrees.

16. The method of claim 15, further comprising determining a hopping sequence for the plurality of beams of RF signals in the narrow beam pattern for the controlling of the communication with the one or more wireless communication devices of the plurality of wireless communication devices.

17. The method of claim 16, further comprising switching between the plurality of beams of RF signals for the controlling of the communication with the one or more wireless communication devices of the plurality of wireless communication devices, wherein the switching between the plurality of beams of RF signals is based on the determined hopping sequence.

18. The method of claim 16, further comprising switching between the plurality of beams of RF signals at a higher switching frequency at transmission periods of the first time-division duplexing configuration than at transmission periods of the second time-division duplexing configuration.

19. The method of claim 16, further comprising switching between the plurality of beams of RF signals at a higher switching frequency at reception periods of the second time-division duplexing configuration than at reception periods of the first time-division duplexing configuration.

20. A computer program product for wireless communication, the computer program product comprising a non-transitory computer-readable storage medium having program instructions embodied therewith, the program instructions are executable by a system to cause the system to execute operations, the operations comprising:

operating a first wireless radio transceiver on a first frequency band with a first time-division duplexing configuration that allocates more time for radio frequency (RF) signal transmission than RF signal reception;

operating a second wireless radio transceiver on a second frequency band with a second time-division duplexing configuration that allocates more time for the RF signal reception than the RF signal transmission;

communicating data on orthogonal polarizations based on the first time-division duplexing configuration and the second time-division duplexing configuration; and concurrently controlling communication with one or more wireless communication devices of a plurality of wireless communication devices on the first frequency band and the second frequency band based on:

the first-time-division duplexing configuration and the second time-division duplexing configuration, and the communicating of the data on the orthogonal polarizations.

* * * * *